(12) United States Patent
Long et al.

(10) Patent No.: US 11,078,434 B2
(45) Date of Patent: Aug. 3, 2021

(54) PROCESS AND SYSTEM FOR UPGRADING LOW-QUALITY OILS

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Jun Long, Beijing (CN); Huandi Hou, Beijing (CN); Zijun Wang, Beijing (CN); Haiping Shen, Beijing (CN); Ming Dong, Beijing (CN); Lishun Dai, Beijing (CN); Jianhong Gong, Beijing (CN); Jiguang Li, Beijing (CN); Shuhong Zhang, Beijing (CN); Cuihong Wang, Beijing (CN); Yucheng She, Beijing (CN); Yuzhang Wang, Beijing (CN); Mengying Tao, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 0 days.

(21) Appl. No.: 16/646,070

(22) PCT Filed: Sep. 11, 2017

(86) PCT No.: PCT/CN2017/000580
§ 371 (c)(1),
(2) Date: Mar. 10, 2020

(87) PCT Pub. No.: WO2019/046989
PCT Pub. Date: Mar. 14, 2019

(65) Prior Publication Data
US 2020/0283688 A1 Sep. 10, 2020

(51) Int. Cl.
*C10G 67/02* (2006.01)
*B01D 3/06* (2006.01)
(Continued)

(52) U.S. Cl.
CPC ............. *C10G 67/02* (2013.01); *B01D 3/06* (2013.01); *B01D 11/04* (2013.01);
(Continued)

(58) Field of Classification Search
CPC ........ C10G 21/00; C10G 67/00; C10G 67/02; C10G 69/04; C10G 2300/1044;
(Continued)

(56) References Cited

U.S. PATENT DOCUMENTS

| | | |
|---|---|---|
| 4,686,028 A | 8/1987 | Friday et al. |
| 2006/0118463 A1 | 6/2006 | Colyar et al. |

(Continued)

FOREIGN PATENT DOCUMENTS

| | | |
|---|---|---|
| CN | 1243083 C | 2/2006 |
| CN | 101007966 A | 8/2007 |

(Continued)

OTHER PUBLICATIONS

Speight, J.G. (1999) The Chemistry and Technology of Petroleum, 3rd ed., Marcel-Dekker, 918 pgs [Office action cites Table 14-1 on p. 575].*

(Continued)

*Primary Examiner* — Brian A McCaig
(74) *Attorney, Agent, or Firm* — Novick, Kim & Lee, PLLC; Allen Xue

(57) ABSTRACT

Disclosed is a process and system for upgrading low-quality oils. The upgrading process comprises: (1) subjecting a (Continued)

low-quality oil to a conversion reaction in the presence of hydrogen and optionally in the presence of a conversion catalyst to obtain a conversion product, (2) processing the conversion product to obtain a first processed product, wherein the first processed product comprises a specific amount of a special component, and (3) subjecting the first processed product to extraction separation to obtain an upgraded oil and a pitch. The upgrading process and the upgrading system have the advantages of stable operation, high upgrading efficiency, environmental friendliness, low coke yield or high yield of upgraded oil.

20 Claims, 4 Drawing Sheets

(51) Int. Cl.
| | | |
|---|---|---|
| *B01D 11/04* | (2006.01) | |
| *B01J 19/00* | (2006.01) | |
| *B01J 19/24* | (2006.01) | |
| *C10G 69/04* | (2006.01) | |

(52) U.S. Cl.
CPC ....... *B01J 19/0006* (2013.01); *B01J 19/0013* (2013.01); *B01J 19/245* (2013.01); *C10G 69/04* (2013.01); B01J 2219/0004 (2013.01); B01J 2219/00051 (2013.01); B01J 2219/00162 (2013.01); C10G 2300/107 (2013.01); C10G 2300/1044 (2013.01); C10G 2300/202 (2013.01); C10G 2300/205 (2013.01); C10G 2300/206 (2013.01); C10G 2300/301 (2013.01); C10G 2300/304 (2013.01); C10G 2300/307 (2013.01); C10G 2300/308 (2013.01); C10G 2300/4006 (2013.01); C10G 2300/4012 (2013.01); C10G 2300/4018 (2013.01); C10G 2400/02 (2013.01); C10G 2400/04 (2013.01); C10G 2400/08 (2013.01)

(58) Field of Classification Search
CPC ........ C10G 2300/107; C10G 2300/202; C10G 2300/205; C10G 2300/206; C10G 2300/301; C10G 2300/304; C10G 2300/307; C10G 2300/308; C10G 2300/4006; C10G 2300/4012; C10G 2300/4018; B01D 3/06; B01D 11/04; B01J 19/0006; B01J 19/0013; B01J 19/245; B01J 2219/004; B01J 2219/00051; B01J 2219/00162
See application file for complete search history.

(56) References Cited

U.S. PATENT DOCUMENTS

| | | | |
|---|---|---|---|
| 2007/0158239 A1* | 7/2007 | Satchell | ................. C10G 47/34 208/113 |
| 2009/0129998 A1 | 5/2009 | Haizmann et al. | |
| 2013/0087481 A1 | 4/2013 | Heraud et al. | |
| 2015/0276332 A1* | 10/2015 | Ladkat | ................... B01J 8/0457 165/11.1 |
| 2016/0177203 A1 | 6/2016 | Fecon et al. | |
| 2016/0304794 A1 | 10/2016 | Majcher et al. | |
| 2018/0187093 A1* | 7/2018 | Choi | ..................... C10G 31/08 |

FOREIGN PATENT DOCUMENTS

| | | |
|---|---|---|
| CN | 103789036 A | 5/2014 |
| CN | 104995284 A | 10/2015 |
| WO | 2006066911 A1 | 6/2006 |

OTHER PUBLICATIONS

Russian Patentt Office, Office Action for RU Application No. 2020-113112, dated Apr. 23, 2021.

* cited by examiner

PROCESS AND SYSTEM FOR UPGRADING LOW-QUALITY OILS

TECHNICAL FIELD

The present application relates to the field of fuel chemical industry, particularly to a process for upgrading low-quality oils. The present application also relates to a corresponding upgrading system.

PRIOR ART

In recent years, the quality of fossil fuels becomes poorer year by year. In addition, the production of low-quality fuel oils such as residue, inferior oil, shale oil, heavy oil derived from oil sands, and coal-derived oil also increases year by year. These low-quality oils are characterized by high density, high viscosity, high heteroatoms (sulfur, nitrogen, heavy metals) content or high asphaltenes content. In addition, the existing processing technologies (such as delayed coking) developed for such low-quality oils have problems such as high coke yield, low efficiency of energy utilization, poor economic benefits, and environmentally harmful production processes. Therefore, further development of high-efficiency, green upgrading technology for such low-quality oils has become one of the development directions and research focuses of the petrochemical industry.

Chinese Patent No. ZL200310104918.2 discloses a process for upgrading inferior heavy oils and residual oils, in which the heavy oils and residual oils are first subjected to moderate slurry hydrocracking, so that most or all of the metallic impurities are released from resins and asphaltenes; the hydrotreated product is passed through a metal adsorption reactor that can be operated in a switchable manner or in a manner allowing online replacement of the filler, so that the released metallic impurities in the slurry hydrocracked oil are adsorbed and removed; the demetalized product is sent to a residue fixed bed hydrogenation unit for deep hydrogenation to remove other impurities and produce a high-quality heavy oil feedstock for catalytic cracking.

SUMMARY OF THE INVENTION

After intensive research, the inventor of the present application has developed a novel process and system for upgrading low-quality oils, and thus completed the present application.

Particularly, the present application are directed to the following aspects.

1. An upgrading process, comprising the following steps:

(1) subjecting a low-quality oil used as an upgrading feedstock to a conversion reaction in the presence of hydrogen and optionally in the presence of a conversion catalyst to obtain a conversion product, (2) processing the conversion product (for example by component blending or component separation) to obtain a first processed product, wherein the first processed product comprises from 20 wt % to 60 wt % (preferably from 25 wt % to 55 wt %, based on the total weight of the first processed product) of a component having a boiling point or boiling range between 350° C. and 524° C. (preferably between 355° C. and 500° C., such as between 380° C. and 524° C., or between 400° C. and 500° C.) (especially at least one hydrocarbon optionally comprising a heteroatom), and (3) subjecting the first processed product to extraction separation to obtain an upgraded oil and a pitch, optionally, the upgrading process further comprises the following step:

(4) recycling all or a part of the pitch (for example more than 80 wt %, preferably more than 90 wt %, more preferably at least 95 wt %) to the step (1).

2. The upgrading process according to the preceding aspect 1, wherein the step (2) comprises one or more of the following steps:

(2-1) subjecting the conversion product to a separation at a first pressure and a first temperature to obtain a gas component and a liquid component, (2-2) subjecting the liquid component to a separation at a second pressure and a second temperature to obtain a second separated product and a first separated product, wherein the separation is carried out in such a manner that the first separated product comprises from 20 wt % to 60 wt % (preferably from 25 wt % to 55 wt %, based on the total weight of the first separated product) of a component having a boiling point or boiling range between 350° C. and 524° C. (preferably between 355° C. and 500° C., such as between 380° C. and 524° C., or between 400° C. and 500° C.) (especially at least one hydrocarbon optionally comprising a heteroatom), and the second separated product or any component thereof has a final boiling point of less than or equal to 350° C., (2-3) optionally, separating the second separated product to obtain naphtha and atmospheric gas oil, and (2-4) optionally, recycling the gas component to the step (1), wherein the first pressure is greater than the second pressure, preferably the first pressure is 4-24 MPa greater than the second pressure, and more preferably the first pressure is 7-19 MPa greater than the second pressure.

3. The upgrading process according to any one of the preceding aspects 1-2, wherein the step (3) comprises one or more of the following steps:

(3-1) contacting the first separated product or the first processed product with a solvent at a third pressure and a third temperature (preferably through countercurrent contact) to obtain the upgraded oil and the pitch, (3-2) optionally, subjecting the upgraded oil to a hydrogenation unit to obtain a hydrotreated upgraded oil, (3-3) optionally, subjecting the upgraded oil to hydrocracking to obtain a hydrocracked product, and then separating the hydrocracked product into dry gas, liquefied gas, aviation kerosene, diesel oil, and hydrogenated tail oil, (3-4) optionally, subjecting the hydrotreated upgraded oil to catalytic cracking to obtain a first catalytic cracked product, and then separating the first catalytic cracked product into dry gas, liquefied gas, gasoline, cycle oil and slurry oil, (3-5) optionally, subjecting the hydrotreated upgraded oil to catalytic cracking together with the atmospheric gas oil to obtain a second catalytic cracked product, and then separating the second catalytic cracked product into dry gas, liquefied gas, gasoline, cycle oil and slurry oil, (3-6) optionally, subjecting the hydrotreated upgraded oil to catalytic cracking together with the second separated product to obtain a third catalytic cracked product, and then separating the third catalytic cracked product into dry gas, liquefied gas, gasoline, cycle oil and slurry oil, (3-7) optionally, subjecting the atmospheric gas oil to a hydrogenation unit to obtain diesel oil, (3-8) optionally, subjecting the cycle oil obtained in any step of the upgrading process to a hydrogenation unit alone or together with the upgraded oil to obtain a hydrotreated oil, (3-9) optionally, subjecting the hydrotreated oil to catalytic cracking together with the second separated product to obtain a fourth catalytic cracked product, and then separating the fourth catalytic cracked product into dry gas, liquefied gas, gasoline, cycle oil and slurry oil, (3-10) optionally, recycling the slurry oil obtained in any step of the upgrading process and/or an externally supplied slurry oil to the step (1), step (2) and/or step (3), or (3-11) optionally, recycling the liquefied gas obtained in any step of the upgrading process to the step (3) or step (3-1).

4. The upgrading process according to any one of the preceding aspects 1-3, wherein the conversion reaction is carried out, optionally in the presence of a conversion catalyst, under the following conditions: a hydrogen partial pressure between 10.0 MPa and 25.0 MPa, preferably between 13.0 MPa and 20.0 MPa, a reaction temperature between 380° C. and 470° C., preferably between 400° C. and 440° C., a volumetric space velocity of the upgrading feedstock between 0.01 $h^{-1}$ and 2.0 $h^{-1}$, preferably between 0.1 $h^{-1}$ and 1.0 $h^{-1}$, and a volume ratio of hydrogen to the upgrading feedstock between 500 and 5000, preferably between 800 and 2000.

5. The upgrading process according to any one of the preceding aspects 1-4, wherein the first pressure is in a range from 10.0 MPa to 25.0 MPa, preferably from 13.0 MPa to 20.0 MPa, and the first temperature is in a range from 380° C. to 470° C., preferably from 400° C. to 440° C.; or the second pressure is in a range from 0.1 MPa to 5.0 MPa, preferably from 0.1 MPa to 4.0 MPa, and the second temperature is in a range from 150° C. to 390° C., preferably from 200° C. to 370° C.

6. The upgrading process according to any one of the preceding aspects 1-5, wherein the solvent is one or more of $C_{3-7}$ hydrocarbons, preferably one or more selected from $C_{3-5}$ alkanes and $C_{3-5}$ alkenes, such as one or more selected from $C_{3-4}$ alkanes and $C_{3-4}$ alkenes, and the weight ratio of the solvent to the first separated product or the first processed product is 1-7:1, preferably 1.5-5:1.

7. The upgrading process according to any one of the preceding aspects, wherein the third pressure is in a range from 3 MPa to 12 MPa, preferably from 3.5 MPa to 10 MPa, and the third temperature is in a range from 55° C. to 300° C., preferably from 70° C. to 220° C.

8. The upgrading process according to any one of the preceding aspects 1-7, wherein the step (3-2) or step (3-8) is carried out in the presence of a hydrogenation catalyst under the following conditions: a hydrogen partial pressure between 5.0 MPa and 20.0 MPa, preferably between 8.0 MPa and 15.0 MPa, a reaction temperature between 330° C. and 450° C., preferably between 350° C. and 420° C., a volumetric space velocity of the feedstock oil between 0.1 $h^{-1}$ and 3.0 $h^{-1}$, preferably between 0.3 $h^{-1}$ and 1.5 $h^{-1}$, a volume ratio of hydrogen to feedstock oil between 300 and 3000, preferably between 800 and 1500;

or alternatively, the step (3-3) is carried out in the presence of a hydrocracking catalyst under the following conditions: a hydrogen partial pressure between 10.0 MPa and 20.0 MPa, a reaction temperature between 310° C. and 420° C., a volumetric space velocity of the upgraded oil between 0.3 $h^{-1}$ and 1.2 $h^{-1}$, and a volume ratio of hydrogen to the upgraded oil between 600 and 1500;

or alternatively, the step (3-4), step (3-5), step (3-6) or step (3-9) is carried out in the presence of a cracking catalyst under the following conditions: a reaction temperature between 450° C. and 650° C., preferably between 480° C. and 560° C., a reaction pressure between 0.15 MPa and 0.4 MPa, a reaction time between 0.1 seconds and 10 seconds, preferably between 0.2 seconds and 4 seconds, a weight ratio of cracking catalyst to feedstock oil between 3 and 30, preferably between 5 and 15, a weight ratio of steam to feedstock oil between 0.05 and 0.6, preferably between 0.05 and 0.4;

or alternatively, the step (3-7) is carried out in the presence of a hydrogenation catalyst under the following conditions: a hydrogen partial pressure between 7.0 MPa and 15.0 MPa, a reaction pressure between 8 MPa and 12 MPa, a reaction temperature between 340° C. and 400° C.; a volumetric space velocity of the atmospheric gas oil between 0.6 $h^{-1}$ and 1.5 $h^{-1}$, and a volume ratio of hydrogen to the atmospheric gas oil between 500 and 800.

9. The upgrading process according to any one of the preceding aspects 1-8, wherein the pitch has a softening point of less than 150° C.

10. The upgrading process according to any one of the preceding aspects 1-9, wherein the low-quality oil comprises one or more of, asphaltenes, and pre-asphaltenes, particularly asphaltenes, and is preferably one or more selected from the group consisting of inferior oil, deoiled asphalt, heavy oil, extra heavy oil, coal-derived oil, shale oil, and petrochemical waste oil, and preferably, the heavy oil is one or more selected from the group consisting of topped crude oil, heavy oil derived from oil sands bitumen, and heavy oil having an initial boiling point of greater than 350° C., the coal-derived oil is one or more selected from the group consisting of coal liquefied oil produced by coal liquefaction and coal tar produced by coal pyrolysis, or the petrochemical waste oil is one or more selected from the group consisting of petrochemical waste oil sludge, petrochemical oil residue, and refined products thereof.

11. The upgrading process according to any one of the preceding aspects 1-10, wherein the first separated product or the first processed product has an initial boiling point of greater than or equal to 330° C., or the first separated product or the first processed product further comprises a light component having a boiling point or boiling range of less than or equal to 350° C., or the first separated product or the first processed product further comprises a heavy component having a boiling point or boiling range of greater than 500° C. (preferably greater than 524° C.), and preferably the heavy component comprises one or more of asphaltenes and pre-asphaltenes, particularly asphaltenes.

12. The upgrading process according to any one of the preceding aspects 1-11, wherein the step (2) produces one or more second processed products in addition to the first processed product, wherein the second processed product or any component thereof has a final boiling point of less than or equal to 350° C.

13. An upgrading system, comprising a conversion reaction unit, a conversion product processing unit, a first control unit, an extraction separation unit, and an optional pitch processing unit, wherein the conversion reaction unit is configured to conduct a conversion reaction of a low-quality oil in the presence of hydrogen and optionally in the presence of a conversion catalyst, and discharge the resulted conversion product, the conversion product processing unit is configured to process the conversion products (for example by component blending or component separation) and discharge the resulted first processed product, the first control unit is configured to control the operating conditions (such as operating temperature and/or operating pressure) of the conversion product processing unit such that the first processed product comprises from 20 wt % to 60 wt % (preferably from 25 wt % to 55 wt %, based on the total weight of the first processed product) of a component having a boiling point or boiling range between 350° C. and 524° C. (preferably between 355° C. and 500° C., such as between 380° C. and 524° C., or between 400° C. and 500° C.) (especially at least one hydrocarbon optionally comprising a heteroatom), the extraction separation unit is configured to conduct an extraction separation of the first processed product, and discharge the resulted upgraded oil and pitch, and the pitch processing unit is configured to transport all or a part of the pitch (for example more than 80 wt %, preferably more than 90 wt %, and more preferably at least 95 wt %) to the conversion reaction unit.

14. The upgrading system according to the preceding aspect 13, wherein the conversion product processing unit comprises a first conversion product separation unit, a second conversion product separation unit, an optional second separated product separation unit, and an optional gas component transport unit, the first conversion product separation unit is configured to separate the conversion product and discharge the resulted gas component and liquid component, separately, the second conversion product separation unit is configured to separate the liquid component, and discharge the resulted second separated product and the first separated product, separately, the second separated product separation unit is configured to separate the second separated product and discharge the resulted naphtha and atmospheric gas oil, separately; and the gas component transport unit is configured to transport the gas component to the conversion reaction unit.

15. The upgrading system according to any one of the preceding aspects 13-14, further comprising a second control unit and a third control unit, wherein the second control unit is configured to control the operating pressure (preferably the outlet pressure of the gas component) of the first conversion product separation unit, the third control unit is configured to control the operating pressure (preferably the outlet pressure of the second separated product) of the second conversion product separation unit, so that the operating pressure of the first conversion product separation unit is greater than that of the second conversion product separation unit, preferably, the third control unit is configured to control the operating conditions (such as operating temperature and/or operating pressure) of the second conversion product separation unit so that the first separated product comprises from 20 wt % to 60 wt % (preferably from 25 wt % to 55 wt %, based on the total weight of the first separated product) of a component having a boiling point or boiling range between 350° C. and 524° C. (preferably between 355° C. and 500° C., such as between 380° C. and 524° C., or between 400° C. and 500° C.) (especially at least one hydrocarbon optionally comprising a heteroatom), and the second separated product or any component thereof has a final boiling point of less than or equal to 350° C.

16. The upgrading system according to any one of the preceding aspects 13-15, wherein the extraction separation unit is configured to bring the first separated product or the first processed product into contact with a solvent (preferably through countercurrent contact), and discharge the resulted upgraded oil and pitch, separately.

17. The upgrading system according to any one of the preceding aspects 13-16, further comprising one or more of the following units:

a first hydrogenation unit configured to conduct a hydrotreating on the upgraded oil and discharge the resulted hydrotreated upgraded oil, a second hydrogenation unit configured to conduct hydrocracking of the upgraded oil and separate the resulted hydrocracked product into dry gas, liquefied gas, aviation kerosene, diesel oil, and hydrogenated tail oil.

a first catalytic cracking unit configured to conduct catalytic cracking of the hydrotreated upgraded oil, and separate the resulted first catalytic cracked product into dry gas, liquefied gas, gasoline, cycle oil, and slurry oil, a second catalytic cracking unit configured to conduct catalytic cracking of the hydrotreated upgraded oil along with the atmospheric gas oil, and separate the resulted second catalytic cracked product into dry gas, liquefied gas, gasoline, cycle oil and slurry oil, a third catalytic cracking unit configured to conduct catalytic cracking of the hydrotreated upgraded oil along with the second separated product, and separate the resulted third catalytic cracked product into dry gas, liquefied gas, gasoline, cycle oil and slurry oil, a third hydrogenation unit configured to conduct a hydrotreating on the atmospheric gas oil and discharge the resulted diesel oil, a fourth hydrogenation unit configured to conduct a hydrotreating on the cycle oil obtained in any unit of the upgrading system along with the upgraded oil, and discharge the resulted hydrotreated oil, a fourth catalytic cracking unit configured to conduct catalytic cracking of the hydrotreated oil along with the second separated product, and separate the resulted fourth catalytic cracked product into dry gas, liquefied gas, gasoline, cycle oil and slurry oil, a slurry oil transport unit configured to transport the slurry oil obtained in any unit of the upgrading system and/or an externally supplied slurry oil to the conversion reaction unit, the conversion product processing unit, and/or the extraction separation unit, or a liquefied gas transport unit configured to transport the liquefied gas obtained in any unit of the upgrading system to the extraction separation unit.

Technical Effect

The upgrading process and upgrading system according to the present application can provide at least one of the following technical effects, or, in a preferred case, provide at least two or more of the following technical effects at the same time:

(1) providing less emission of three wastes, little or no production of solid coke, and environmentally friendly production process;

(2) converting a low-quality oil into an upgraded oil rich in saturated structure and comprising substantially no heavy metals and substantially no asphaltenes with high efficiency and maximum conversion, where under optimal conditions, the conversion rate of the low-quality oil can be generally greater than 90 wt %, preferably greater than 95 wt %, and the content of heavy metals (calculated based on Ni+V) in the upgraded oil can be generally less than 10 μg/g, preferably less than 1 μg/g, and the content of asphaltenes in the upgraded oil can be generally less than 2.0 wt %, preferably less than 0.5 wt %.

(3) improving the operation stability of the upgrading process (especially the extraction separation step), and significantly increasing the run length of the upgrading process or the upgrading system;

(4) a high yield of upgraded oil, where under optimal conditions, the yield of the upgraded oil can be up to 88%;

(5) a low yield of toluene-insoluble, where under optimal conditions, the yield of toluene-insoluble can be as low as 0.5%; and (6) providing an upgraded oil that can be further processed to produce high-quality aviation kerosene satisfying the Chinese National Standard, high-octane gasoline, or high-quality diesel oil satisfying the Chinese National VI Standard, where under optimal conditions, the yield of high-octane gasoline can be generally greater than 50% by weight, or the yield of high-quality aviation kerosene can be generally greater than 35% by weight.

DETAILED DESCRIPTION OF THE INVENTION

Figure 1:
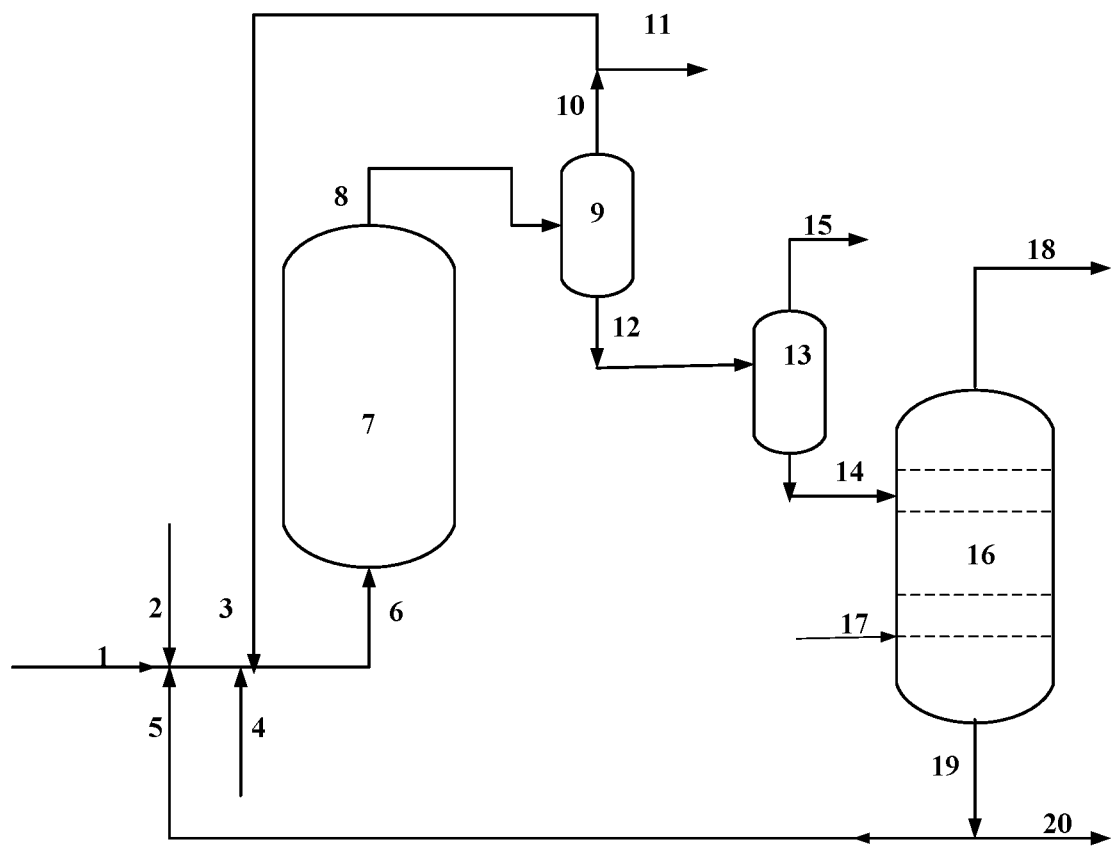
FIG. 1 schematically illustrates the process for upgrading low-quality oils according to an embodiment of the present application.

The embodiments of the present application will be described in detail herein below, but it should be noted that the scope of the present application is not limited to these embodiments, but is set forth in the appended claims.

All publications, patent applications, patents, and other references mentioned herein are hereby incorporated by reference. Unless defined otherwise, all technical and scientific terms used herein have the meanings commonly understood by those skilled in the art. In case of conflict, the definitions provided herein shall prevail.

Where a material, substance, method, step, device, component, and the like mentioned herein is modified using the phrase "conventionally used in the art", "conventionally known in the art", or the like, the subject modified by such a phrase should be interpreted to cover not only those that are routinely used or known in the art at the time when the present application was filed, but also those that are not commonly used or generally known at present but will become recognized in the art as being useful for similar purposes.

In the context of the present application, the term "asphaltenes" should be understood in accordance with its usual meaning in the field of fuel chemical industry. For example, the species present in oils that are soluble in toluene but insoluble in n-hexane are generally referred to as asphaltenes.

In the context of the present application, the term "pre-asphaltene(s)" should be understood in accordance with its usual meaning in the field of fuel chemical industry. For example, the species present in oils that are soluble in tetrahydrofuran but insoluble in toluene are generally referred to as pre-asphaltene(s).

In the context of the present application, the term "asphaltenes" should be understood in accordance with its usual meaning in the field of fuel chemical industry. For example, the species in oils that are insoluble in non-polar, small-molecular n-alkanes (such as n-pentane or n-heptane) but soluble in benzene or toluene are generally referred to as asphaltenes.

In the context of the present application, the term "petrochemical oil" generally refers to various oils that are used as a feedstock or manufactured as a product in the field of fuel chemical industry, including fossil fuels, fuel oils, and fossil fuel derived products (such as diesel oil and kerosene etc.), waste oil or waste pitch, etc.

In the context of the present application, the term "low-quality oil(s)" refers to any oil in the field of fuel chemical industry that needs upgrading. Examples of the oil include low-quality fossil fuels, low-quality fuel oils, low-quality fossil fuel derived products (such as low-quality gasoline, diesel oil, etc.), waste oil or waste residues from fossil fuel processing, and the like. As the needs for upgrading, for example, a chemical reaction may be mentioned that can be used to change the molecular structure of one or more components of the oil to obtain fuel chemical products such as gasoline, diesel oil, kerosene, liquefied gas, and naphtha, etc. Examples of said components include aromatic components and asphaltenes.

In the context of the present application, the term "inferior oil" should be understood in accordance with its usual meaning in the field of fuel chemical industry. For example, the oils having any one or more of the following characteristics are generally referred to as inferior oil: an API degree of less than 27, a sulfur content of greater than 1.5 wt %, a TAN (total acid value) of greater than 1.0 mgKOH/g, a boiling range of greater than 500° C., an asphaltenes content of greater than 10 wt %, and a heavy metal content (calculated based on Ni+V) of greater than 100 μg/g.

In the context of the present application, the term "residue" should be understood in accordance with its usual meaning in the field of fuel chemical industry. For example, the bottoms obtained by distillation of crude oil at atmospheric and vacuum pressure are generally referred to as residue. For further examples, the bottoms of atmospheric columns are generally referred to as atmospheric residues (generally including fractions having a boiling point of greater than 350° C.), or the bottoms of vacuum columns are generally referred to as vacuum residues (generally including fractions having a boiling point of greater than 500° C. or 524° C.).

In the context of the present application, the term "cycle oil" should be understood in accordance with its usual meaning in the field of fuel chemical industry. For example, the fraction obtained in catalytic cracking processes having a boiling range between 205° C. and 350° C. (also known as diesel oil fraction) or having a boiling range between 343° C. and 500° C. (also known as heavy cycle oil) is generally referred to as cycle oil.

In the context of the present application, after the bottom oil obtained from the fractionation step of cracking processes is separated in a settler, the product withdrawn from the upper part of the settler is generally referred to as decant oil, and the product withdrawn from the bottom of the settler is generally referred to as slurry oil.

In the context of the present application, the term "heavy oil" should be understood in accordance with its usual meaning in the field of fuel chemical industry. For example, distillates or residues having a boiling point above 350° C. are generally referred to as heavy oil. For further example, the distillates generally refers to a distillate product obtained by atmospheric distillation or vacuum distillation of crude oils or secondary processing oils, such as heavy diesel oil, heavy gas oil, lubricating oil fraction, cracking feedstock, or the like.

In the context of the present application, the term "extra heavy oil" should be understood in accordance with its usual meaning in the field of fuel chemical industry. For example, crude oils with a higher content of asphaltenes and resins and a higher viscosity are generally referred to as extra heavy oil. For further example, crude oils with a density of more than 0.943 at 20° C. on the ground and a viscosity of more than 50 centipoises underground are generally referred to as extra heavy oil.

In the context of the present application, the term "deoiled asphalt" should be understood in accordance with its usual meaning in the field of fuel chemical industry. For example, it generally refers to the asphaltenes-rich and aromatics-rich raffinate obtained from the bottom of the extraction column of a solvent deasphalting device by contacting a feedstock oil with a solvent to dissolve and separate the soluble components. Depending on the type of solvent, it can be divided into propane deoiled asphalt, butane deoiled asphalt, pentane deoiled asphalt, and so on.

In the context of the present application, the term "topped crude oil" should be understood in accordance with its usual meaning in the field of fuel chemical industry. For example, where a crude oil is fractionated in an atmospheric or vacuum distillation process, the oil discharged from the bottom of the initial distillation column or the bottom of the flash column is generally referred to as topped crude oil.

In the context of the present application, the term "coal-derived oil" should be understood in accordance with its usual meaning in the field of fuel chemical industry. For example, the liquid fuel obtained by chemical processing using coal as the raw material is generally referred to as coal-derived oil.

In the context of the present application, the term "shale oil" should be understood in accordance with its usual meaning in the field of fuel chemical industry. For example, the brown viscous paste obtained when subjecting kerogen shale to low-temperature carbonization is generally referred to as shale oil, which has a pungent odor and a high nitrogen content.

In the context of the present application, the term "separation" generally refers to physical separation, such as extraction, liquid separation, distillation, evaporation, flash evaporation, condensation, etc., unless otherwise specifically stated or does not meet the conventional understanding of those skilled in the art.

In the context of the present application, boiling point, boiling range (sometimes also referred to as distillation range), final boiling point and initial boiling point or similar parameters all refer to values measured at normal pressure (101325 Pa).

All percentages, parts, ratios, etc. provided herein are expressed on weight basis, unless otherwise specifically stated or does not meet the conventional understanding of those skilled in the art.

It should be particularly noted that two or more aspects (or embodiments) disclosed in the context of the present application can be arbitrarily combined with each other, and the technical solution (such as methods or systems) thus obtained forms a part of the original disclosure of the specification, and falls within the scope of the present application.

According to the present application, an upgrading process is first provided which comprises at least the following step (1), step (2), and step (3).

Step (1): a low-quality oil is subjected to a conversion reaction in the presence of hydrogen to obtain a conversion product (hereinafter, this step is referred to as feedstock conversion step). In this case, the low-quality oil is used as the upgrading feedstock.

According to an aspect of the present application, in the step (1), in order to make one or more of the technical effects of the present application more significant, the low-quality oil may comprise asphaltenes, pre-asphaltenes, or two of asphaltenes, and pre-asphaltenes, particularly asphaltine and/or pre-asphaltenenes. These low-quality oils may be used alone or in combination at any ratio. The present application is not intended to specify the content of the asphaltenes, or the pre-asphaltenes in the low-quality oil, as long as it is considered to be "comprised" in the low-quality oil according to the conventional understanding of those skilled in the art. Nevertheless, for convenience of understanding, the content may be, for example, 0.5 wt % or more in general.

According to an aspect of the present application, in the step (1), as examples of the low-quality oil, inferior oil, deoiled asphalt, heavy oil, extra heavy oil, coal-derived oil, shale oil, and petrochemical waste oil may be mentioned. More particularly, as examples of the heavy oil, topped crude oil, heavy oil derived from oil sands bitumen, and heavy oil having an initial boiling point of greater than 350° C. may be mentioned. In addition, as examples of the coal-derived oil, coal liquefied oil produced by coal liquefaction and coal tar produced by coal pyrolysis may be mentioned. Further, as examples of the petrochemical waste oil, petrochemical waste oil sludge, petrochemical oil residue, and refined products thereof may be mentioned. These low-quality oils may be used alone or in combination at any ratio.

According to an aspect of the present application, in the step (1), the conversion reaction (also referred to as hydrogen-thermal conversion reaction) may be carried out in any manner known in the art, and is not particularly limited. In addition, the conversion reaction may be carried out in any conversion reaction device (such as a thermal conversion reactor) known in the art, and a person skilled in the art can make a reasonable selection for this.

According to an aspect of the present application, in the step (1), the hydrogen partial pressure may be selected according to conventional knowledge in the art, but is generally in a range from 10.0 MPa to 25.0 MPa, preferably from 13.0 MPa to 20.0 MPa.

According to an aspect of the present application, in the step (1), the reaction temperature may be selected according to conventional knowledge in the art, but is generally in a range from 380° C. to 470° C., preferably from 400° C. to 440° C.

According to an aspect of the present application, in the step (1), the volumetric space velocity of the upgrading feedstock (such as the low-quality oil) may be selected according to conventional knowledge in the art, but is generally in a range from 0.01 $h^{-1}$ to 2.0 $h^{-1}$, preferably from 0.1 to 1.0 $h^{-1}$.

According to an aspect of the present application, in the step (1), the volume ratio of hydrogen to the upgrading feedstock (such as the low-quality oil) may be selected according to conventional knowledge in the art, but is generally in a range from 500 to 5000, preferably from 800 to 2000.

According to an aspect of the present application, in the step (1), the conversion reaction may be carried out in the presence or absence of a conversion catalyst. Here, as the conversion catalyst, for example, any conversion catalyst conventionally used in the art for this purpose or conversion catalysts produced according to any production method conventionally known in the art may be mentioned, and is not particularly limited. For example, as the conversion catalyst, bulk conversion catalysts, particularly compounds of Group VB metals of the Periodic Table of the Elements, compounds of Group VIB metals of the Periodic Table of the Elements, and compounds of Group VIII metals and the like, especially Mo compounds, W compounds, Ni compounds, Co compounds, Fe compounds, V compounds, Cr compounds, and the like may be mentioned. These compounds may be used alone or in combination at any ratio. In addition, as the amount of the conversion catalyst, it is generally in a range from 10 µg/g to 50,000 µg/g, preferably from 30 µg/g to 25000 µg/g, based on the total weight of the upgrading feedstock (such as the low-quality oil).

Step (2): the conversion product is processed to obtain a first processed product (hereinafter referred to as conversion product processing step).

According to an aspect of the present application, in the step (2), the processing may be carried out in any manner known in the art, so long as the conversion product obtained after the processing comprises from 20 wt % to 60 wt % (hereinafter referred to as specific amount) of a component having a boiling point or boiling range between 350° C. and 524° C. (hereinafter referred to as special component), thereby producing the first processed product. Here, as the processing, for example, a given amount of the special component may be added to or removed from the conversion product, so that the first processed product finally obtained comprises the specific amount of the special component (hereinafter referred to as component blending method), or the conversion product may be subjected to component separation, so that the first processed product finally obtained comprises the specific amount of the special component (hereinafter referred to as component separation method).

According to an aspect of the present application, in the step (2), by modifying the first processed product to comprise the specific amount of the special component, at least the operation stability of the upgrading process (especially the extraction separation step) can be improved. Here, the specific amount is generally in a range from 20 wt % to 60 wt %, preferably from 25 wt % to 55 wt %, based on the total weight of the first processed product.

According to an aspect of the present application, in the step (2), the boiling point or boiling range of the special component may further be between 350° C. and 524° C., such as between 380° C. and 524° C., or between 400° C. and 500° C.

According to an aspect of the present application, in the step (2), the special component is derived from a petrochemical oil, and is generally a hydrocarbon, especially a mixture of a plurality of hydrocarbons. Here, the hydrocarbon refers to a compound consisting essentially of carbon and hydrogen atoms, but, sometimes, there may also be a heteroatom such as O, N, P, Cl, or S in its molecular structure. The present application is not intended to specify the chemical structure of the special component, as long as its content and boiling point (or boiling range) meet any of the corresponding provisions as set forth hereinbefore. Moreover, the special component can be purchased from the market or can be produced by a simple method as long as it belongs to a petrochemical oil (especially the hydrocarbon or hydrocarbon mixture) and its boiling point (or boiling range) meets any of the corresponding provisions as set forth hereinbefore. In view of this, as its source, the special component can be directly come from the conversion product because it is usually contained in the conversion product as a constituent component. Alternatively, the special component may also be come from the upgrading feedstock or the petrochemical oil obtained from any step of the upgrading process described herein, especially from the residues, slurry oil and the like described hereinbelow. In addition, as a process for producing the special component, for example, the petrochemical oil may be distillated while retaining a fraction having a boiling point (or boiling range) that satisfies any of the corresponding provisions as set forth hereinbefore, to obtain the special component. In addition, as a method for measuring the specific amount of the special component, for example, the first processed product may be distillated while retaining all of the fraction having a boiling point (or boiling range) that satisfies any of the corresponding provisions as set forth hereinbefore, and the percentage of the fraction relative to the total weight of the first processed product is recorded as the specific amount.

According to an aspect of the present application, in the step (2), the initial boiling point of the first processed product is generally greater than or equal to 300° C., for example greater than or equal to 330° C., and for further example greater than or equal to 350° C.

According to an aspect of the present application, in the step (2), in addition to the special component, the first processed product may further comprise a light component having a boiling point or boiling range of less than or equal to 350° C. The present application is not intended to specify the content of the light component in the first processed product, but as an example, the content of the light component may be, for example, in a range from 1 wt % to 10 wt %, based on the total weight of the first processed product.

According to an aspect of the present application, in the step (2), in addition to the special component, the first processed product may further comprise a heavy component having a boiling point or boiling range of greater than 500° C. (preferably greater than 524° C.). Here, the expression "having a boiling point or boiling range of greater than 500° C." means that the heavy component shows a boiling point or boiling range that is greater than 500° C., but also covers the case that the heavy component may undergo a thermal decomposition at a temperature greater than 500° C. and does not show a boiling point or boiling range. In addition, in order to make one or more of the technical effects of the present application more significant, in a preferred case, the heavy component may comprise asphaltenes, pre-asphaltenes, or a combination thereof as a constituent component, particularly comprise asphaltenes as a constituent component. The present application is not intended to specify the content of the heavy component in the first processed product, but as an example, the content of the heavy component may be, for example, the balance amount, based on the total weight of the first processed product.

According to an aspect of the present application, in the step (2), in addition to the special component and the light component, the first processed product may further comprise a heavy component having a boiling point or boiling range of greater than 500° C. (preferably greater than 524° C.). Here, the expression "having a boiling point or boiling range of greater than 500° C." means that the heavy component shows a boiling point or boiling range that is greater than 500° C., but also covers the case that the heavy component may undergo a thermal decomposition at a temperature greater than 500° C. and does not show a boiling point or boiling range. In addition, in order to make one or more of the technical effects of the present application more significant, in a preferred case, the heavy component may comprise asphaltenes, pre-asphaltenes, or a combination thereof as a constituent component, particularly comprise asphaltenes as a constituent component. The present application is not intended to specify the content of the heavy component in the first processed product, but as an example, the content of the heavy component may be, for example, the balance amount, based on the total weight of the first processed product. According to an aspect of the present application, in the step (2), one or more second processed products may be obtained in addition to the first processed product. Here, the second processed product or any component thereof may show a final boiling point of less than or equal to 350° C.

According to an aspect of the present application, in the step (2), as examples of the component separation method, evaporation, distillation, and flash evaporation may be mentioned. These component separation methods may be carried out in any manner conventionally known in the art, so long as the first processed product can be finally obtained. More particularly, as an example of the component separation method, a separation method comprising the following step (2-1) and step (2-2) may be mentioned.

Step (2-1): the conversion product is separated at a first pressure and a first temperature to obtain a gas component and a liquid component.

According to an aspect of the present application, in the step (2-1), the separation may be carried out according to any method and in any manner known in the art, and examples thereof may include distillation, fractionation, and flash evaporation, particularly distillation. In addition, the separation may be carried out in any separation device (such as a distillation column) known in the art, and a person skilled in the art can make a reasonable selection for this.

According to an aspect of the present application, in the step (2-1), the gas component is generally rich in hydrogen, or the gas component comprises hydrogen as a main component. Here, the present application is not intended to specify the content of hydrogen in the gas component, but as an example, the content of hydrogen is generally at least 85 wt % or more. According to the need, the gas component may be recycled to the step (1) as hydrogen to participate in the conversion reaction. In addition, for example, when performing the separation using a pressure distillation column or the like, the gas component refers to the overhead fraction and the liquid component refers to the bottom fraction.

According to an aspect of the present application, in the step (2-1), the first pressure is generally in a range from 10.0 MPa to 25.0 MPa, and preferably from 13.0 MPa to 20.0 MPa. Here, for convenience of measurement, the first pressure generally refers to the pressure of the gas component, or in other words, when the separation is carried out using a separation device, the first pressure generally refers to the outlet pressure of the gas component as it leaves the separation device.

According to an aspect of the present application, in the step (2-1), the first temperature is generally in a range from 380° C. to 470° C., preferably from 400° C. to 440° C. Here, for convenience of measurement, the first temperature generally refers to the temperature of the liquid component, or in other words, when the separation is carried out using a separation device, the first temperature generally refers to the outlet temperature of the liquid component as it leaves the separation device.

Step (2-2): the liquid component is separated at a second pressure and a second temperature to obtain a second separated product and a first separated product.

According to an aspect of the present application, in the step (2-2), the separation may be carried out according to any method and in any manner known in the art, and examples thereof may include distillation and fractionation, especially atmospheric distillation or pressure distillation. In addition, the separation may be carried out in any separation device known in the art (such as an atmospheric distillation tank or a pressure distillation column), and a person skilled in the art can make a reasonable selection for this.

According to an aspect of the present application, in the step (2-2), the second pressure is generally in a range from 0.1 MPa to 5.0 MPa, and preferably from 0.1 MPa to 4.0 MPa. Here, for convenience of measurement, the second pressure generally refers to the pressure of the second separated product, or in other words, when the separation is carried out using a separation device, the second pressure generally refers to the outlet pressure of the second separated product when it leaves the separation device.

According to an aspect of the present application, in the step (2-2), the second temperature is generally in a range from 150° C. to 390° C., preferably from 200° C. to 370° C. Here, for convenience of measurement, the second temperature generally refers to the temperature of the first separated product, or in other words, when the separation is carried out using a separation device, the second temperature generally refers to the outlet pressure of the first separated product when it leaves the separation device.

According to an aspect of the present application, in order to make one or more of the technical effects of the present application more significant, the first pressure is generally greater than the second pressure, and preferably the first pressure is 4-24 MPa greater than the second pressure, and more preferably, the first pressure is 7-19 MPa greater than the second pressure.

According to an aspect of the present application, in the step (2-2), in order to make one or more of the technical effects described in the present application more significant, after the separation, the first separated product finally obtained comprises from 20 wt % to 60 wt % (hereinafter referred to as specific amount) of a component having a boiling point or boiling range between 350° C. and 524° C. (hereinafter referred to as special component), and meanwhile the second separated product or any component thereof has a final boiling point of less than or equal to 350° C.

According to an aspect of the present application, in the step (2-2), the specific amount of the special component is generally in a range from 20 wt % to 60 wt, preferably from 25 wt % to 55 wt %, based on the total weight of the first separated product.

According to an aspect of the present application, in the step (2-2), the boiling point or boiling range of the special component may be further between 350° C. and 500° C., for example between 380° C. and 524° C., or between 400° C. and 500° C.

According to an aspect of the present application, in the step (2-2), the special component is generally a hydrocarbon, especially a mixture of a plurality of hydrocarbons. Here, the hydrocarbon refers to a compound consisting essentially of carbon and hydrogen atoms. However, there may also be a heteroatom, such as O, N, P, Cl, or S, in its molecular structure. The present application is not intended to specify the chemical structure of the special component, as long as its content and boiling point (or boiling range)

meet any of the corresponding provisions as set forth hereinbefore. In addition, it can be known from the manner in which the special component is obtained that the special component is originally contained as a constituent component in the conversion product or the liquid component. Then, after the separation, the special component (e.g. a part or all of it) becomes a necessary constituent component of the first separated product. In addition, as a method for measuring the specific amount of the special component, for example, the first separated product may be distilled while retaining all of the fraction having a boiling point (or boiling range) that satisfies any of the corresponding provisions as set forth hereinbefore, and the percentage of the fraction relative to the total weight of the first processed product is recorded as the specific amount.

According to an aspect of the present application, in the step (2-2), the initial boiling point of the first separated product is generally greater than or equal to 300° C., for example greater than or equal to 330° C., and for further example greater than or equal to 350° C.

According to an aspect of the present application, in the step (2-2), in addition to the special component, the first separated product may further comprise a light component having a boiling point or boiling range of less than or equal to 350° C. The present application is not intended to specify the content of the light component in the first separated product, but as an example, the content of the light component may be, for example, in a range from 1 wt % to 10 wt %, based on the total weight of the first separated product.

According to an aspect of the present application, in the step (2-2), in addition to the special component, the first separated product may further comprise a heavy component having a boiling point or boiling range of greater than 500° C. (preferably greater than 524° C.). Here, the expression "having a boiling point or boiling range of greater than 500° C." means that the heavy component shows a boiling point or boiling range that is greater than 500° C., but also covers the case that the heavy component may undergo a thermal decomposition at a temperature greater than 500° C., and does not show a boiling point or boiling range. In addition, in order to make one or more of the technical effects of the present application more significant, in a preferred case, the heavy component may comprise asphaltenes, pre-asphaltenes, or a combination thereof as a constituent component, particularly comprises asphaltenes as a constituent component. The present application is not intended to specify the content of the heavy component in the first separated product, but as an example, the content of the heavy component may be, for example, the balance amount, based on the total weight of the first separated product.

According to an aspect of the present application, in the step (2-2), in addition to the special component and the light component, the first separated product may further comprise a heavy component having a boiling point or boiling range of greater than 500° C. (preferably greater than 524° C.). Here, the expression "having a boiling point or boiling range of greater than 500° C." means that the heavy component shows a boiling point or boiling range that is greater than 500° C., but also covers the case that the heavy component may undergo a thermal decomposition at a temperature greater than 500° C., and does not show a boiling point or boiling range. In addition, in order to make one or more of the technical effects of the present application more significant, in a preferred case, the heavy component may comprise asphaltenes, pre-asphaltenes, or a combination thereof as a constituent component, particularly comprises asphaltenes as a constituent component. The present application is not intended to specify the content of the heavy component in the first separated product, but as an example, the content of the heavy component may be, for example, the balance amount, based on the total weight of the first separated product.

According to an aspect of the present application, in the step (2-2), for example, when the separation is carried out using a distillation column, a flash tank, or the like, the first separated product refers to the bottom liquid of the column or the condensate at the bottom of the tank, and the second separated product refers to the overhead light component of the column or the overhead flashed light component of the tank.

According to an aspect of the present application, the conversion product processing step may optionally further comprise the following step (2-3), step (2-4), or a combination thereof.

Step (2-3): the second processed product (including the second separated product) is separated to obtain naphtha and atmospheric gas oil.

According to an aspect of the present application, in the step (2-3), the separation may be carried out according to any method and in any manner known in the art, and examples thereof may include distillation and fractionation, especially fractionation. In addition, the separation may be carried out in any separation device (such as a fractionation column) known in the art, and a person skilled in the art can make a reasonable selection for this.

According to an aspect of the present application, in the step (2-3), the operating pressure is generally in a range from 0.05 MPa to 2.0 MPa, preferably from 0.10 MPa to 1.0 MPa.

According to an aspect of the present application, in the step (2-3), the operating temperature is generally in a range from 50° C. to 350° C., preferably from 150° C. to 330° C.

Step (2-4): the gas component is recycled to the step (1).

According to an aspect of the present application, in the step (2-4), the gas component may be recycled as hydrogen to any operation step in the upgrading process that requires the presence of hydrogen, such as the step (1).

Step (3): the first processed product (including the first separated product) is subjected to extraction separation to obtain an upgraded oil and a pitch (hereinafter referred to as extraction separation step).

According to an aspect of the present application, in the step (3), in order to make one or more of the technical effects described in the present application more significant, especially to further improve the operation stability of the extraction separation step, the softening point of the pitch is generally less than 150° C.

According to an aspect of the present application, the step (3) may be carried out according to an extraction separation method including the step (3-1).

Step (3-1): the first processed product (including the first separated product) is contacted with a solvent at a third pressure and a third temperature to obtain the upgraded oil and the pitch.

According to an aspect of the present application, in the step (3-1), the contact may be carried out in any method and in any manner known in the art, so long as the first processed product can be sufficiently extracted using the solvent to obtain the upgraded oil and the pitch, and examples thereof may include countercurrent contact. In addition, the extraction may be carried out in any extraction device (such as an extraction column) known in the art, and a person skilled in the art can make a reasonable selection for this.

According to an aspect of the present application, in the step (3-1), as the solvent, for example, $C_{3-7}$ hydrocarbons may be mentioned, and particularly $C_{3-5}$ alkanes and $C_{3-5}$ alkenes, especially $C_{3-4}$ alkanes and $C_{3-4}$ alkenes, may be mentioned. These solvents may be used alone or in combination at any ratio. In addition, as the solvent or a part thereof, the liquefied gas described hereinafter may also be used.

According to an aspect of the present application, in the step (3-1), the weight ratio of the solvent to the first processed product (including the first separated product), referred to as the solvent ratio, is generally 1-7:1, preferably 1.5-5:1.

According to an aspect of the present application, in the step (3-1), the third pressure is generally in a range from 3 MPa to 12 MPa, preferably from 3.5 MPa to 10 MPa.

According to an aspect of the present application, in the step (3-1), the third temperature is generally in a range from 55° C. to 300° C., preferably from 70° C. to 220° C.

According to an aspect of the present application, in view of the need, the extraction separation step may optionally further comprise one or more of the following steps (3-2) to (3-11).

Step (3-2): optionally, the upgraded oil is subjected to a hydrotreatment to obtain a hydrotreated upgraded oil.

According to an aspect of the present application, in the step (3-2), the hydrotreatment may be carried out in any manner known in the art, and is not particularly limited. In addition, the hydrotreatment may be carried out in any hydrotreatment device (such as a fixed-bed reactor, a fluidized-bed reactor) known in the art, and a person skilled in the art may make a reasonable selection for this.

According to an aspect of the present application, in the step (3-2), the hydrogen partial pressure may be selected according to conventional knowledge in the art, but is generally in a range from 5.0 MPa to 20.0 MPa, preferably from 8.0 MPa to 15.0 MPa.

According to an aspect of the present application, in the step (3-2), the reaction temperature may be selected according to conventional knowledge in the art, but is generally in a range from 330° C. to 450° C., preferably from 350° C. to 420° C.

According to an aspect of the present application, in the step (3-2), the volumetric space velocity of the feedstock oil (referring to the upgraded oil) may be selected according to conventional knowledge in the art, but is generally in a range from 0.1 $h^{-1}$ to 3.0 $h^{-1}$, preferably from 0.3 to 1.5 $h^{-1}$.

According to an aspect of the present application, in the step (3-2), the volume ratio of hydrogen to the feedstock oil (referring to the upgraded oil) may be selected according to conventional knowledge in the art, but is generally in a range from 300 to 3000, preferably from 800 to 1500.

According to an aspect of the present application, in the step (3-2), the hydrotreatment is generally carried out in the presence of a hydrogenation catalyst. Here, as the hydrogenation catalyst, for example, any hydrogenation catalyst conventionally used in the art for this purpose or any hydrogenation catalyst produced according to any method conventionally known in the art may be mentioned, and the amount of the hydrogenation catalyst used in the step may be selected according to the conventional knowledge in the art, and is not particularly limited. Particularly, the hydrogenation catalyst generally comprises a support and an active metal component. More particularly, examples of the active metal component may include metals of Group VIB of the Periodic Table of the Elements and non-noble metals of Group VIII of the Periodic Table of the Elements, especially combinations of nickel and tungsten, combinations of nickel, tungsten, and cobalt, combinations of nickel and molybdenum, or combinations of cobalt and molybdenum. These active metal components may be used alone or in combination at any ratio. Examples of the support may include alumina, silica, and amorphous silica-alumina. These supports may be used alone or in combination at any ratio. In the present application, the contents of the support and the active metal component are not particularly limited, and may be selected according to conventional knowledge in the art.

Step (3-3): optionally, the upgraded oil is subjected to hydrocracking to obtain a hydrocracked product.

According to an aspect of the present application, in the step (3-3), the hydrocracking may be carried out in any manner known in the art, and is not particularly limited. In addition, the hydrocracking may be carried out in any hydrocracking device (such as a fixed-bed reactor, a fluidized-bed reactor) known in the art, and a person skilled in the art can make a reasonable selection for this.

According to an aspect of the present application, in the step (3-3), the hydrocracked product can be further separated into dry gas, liquefied gas, aviation kerosene, diesel oil, and hydrogenated tail oil. Here, the separation may be carried out according to any method and in any manner known in the art, and examples thereof may include distillation and fractionation, especially fractionation. In addition, the separation may be carried out in any separation device (such as a fractionation column) known in the art, and a person skilled in the art can make a reasonable selection for this.

According to an aspect of the present application, in the step (3-3), the hydrogen partial pressure may be selected according to conventional knowledge in the art, but is generally in a range from 10.0 MPa to 20.0 MPa.

According to an aspect of the present application, in the step (3-3), the reaction temperature may be selected according to conventional knowledge in the art, but is generally in a range from 310° C. to 420° C.

According to an aspect of the present application, in the step (3-3), the volumetric space velocity of the upgraded oil may be selected according to conventional knowledge in the art, but is generally in a range from 0.3 $h^{-1}$ to 1.2 $h^{-1}$.

According to an aspect of the present application, in the step (3-3), the volume ratio of hydrogen to the upgraded oil may be selected according to conventional knowledge in the art, but is generally in a range from 600 to 1500.

According to an aspect of the present application, in the step (3-3), the hydrocracking is generally carried out in the presence of a hydrocracking catalyst. Here, as the hydrocracking catalyst, for example, any hydrocracking catalyst conventionally used in the art for this purpose or any hydrocracking catalyst produced according to any method conventionally known in the art may be mentioned, and the amount of the hydrocracking catalyst used in the step may be selected according to conventional knowledge in the art, and is not particularly limited. Particularly, the hydrocracking catalyst generally comprises a support, an active metal component, and a cracking active component. More particularly, examples of the active metal component may include sulfides of metals of Group VIB of the Periodic Table of the Elements, sulfides of base metals of Group VIII of the Periodic Table of the Elements, or precious metals of Group VIII of the Periodic Table of the Elements, especially Mo sulfide, W sulfide, Ni sulfide, Co sulfide, Fe sulfide, Cr sulfide, Pt and Pd, etc. These active metal components may be used alone or in combination at any ratio. Examples of the cracking active component may include amorphous silica-alumina and molecular sieves. These cracking active components may be used alone or in combination at any ratio.

Examples of the support may include alumina, silica, titanium oxide, and activated carbon. These supports may be used alone or in combination at any ratio. In the present application, the content of each of the support, the active metal component, and the cracking active component is not particularly limited, and may be selected according to conventional knowledge in the art.

Step (3-4): optionally, the hydrotreated upgraded oil is subjected to fluid catalytic cracking (abbreviated as FCC) to obtain the first catalytic cracked product.

According to an aspect of the present application, in the step (3-4), the first catalytic cracked product may be further separated into dry gas, liquefied gas, gasoline, cycle oil, and oil slurry. Here, the separation may be carried out according to any method and in any manner known in the art, and examples thereof may include distillation and fractionation, especially fractionation. In addition, the separation may be carried out in any separation device (such as a fractionation column) known in the art, and a person skilled in the art can make a reasonable selection for this.

According to an aspect of the present application, in the step (3-4), the catalytic cracking may be carried out in any manner known in the art, and is not particularly limited. In addition, the catalytic cracking may be carried out in any catalytic cracking device (such as a fluidized bed reactor) known in the art, and a person skilled in the art can make a reasonable selection for this.

According to an aspect of the present application, in the step (3-4), the reaction temperature may be selected according to conventional knowledge in the art, but is generally in a range from 450° C. to 650° C., preferably from 480° C. to 560° C.

According to an aspect of the present application, in the step (3-4), the reaction pressure may be selected according to conventional knowledge in the art, but is generally in a range from 0.15 MPa to 0.4 MPa.

According to an aspect of the present application, in the step (3-4), the reaction time may be selected according to conventional knowledge in the art, but is generally in a range from 0.1 seconds to 10 seconds, preferably from 0.2 seconds to 4 seconds.

According to an aspect of the present application, in the step (3-4), the weight ratio of the cracking catalyst to the feedstock oil (referring to the hydrotreated upgraded oil) may be selected according to conventional knowledge in the art, but is generally in a range from 3 to 30, preferably from 5 to 15.

According to an aspect of the present application, in the step (3-4), the weight ratio of steam to the feedstock oil (referring to the hydrotreated upgraded oil) may be selected according to conventional knowledge in the art, but is generally in a range from 0.05 to 0.6, preferably from 0.05 to 0.4.

According to an aspect of the present application, in the step (3-4), the catalytic cracking is generally carried out in the presence of a cracking catalyst. Here, as the cracking catalyst, for example, any cracking catalyst conventionally used in the art for this purpose or any cracking catalyst produced according to any method conventionally known in the art may be mentioned, and is not particularly limited. Particularly, the cracking catalyst is generally a solid acid catalyst, and preferably comprises a cracking active component and a support. More particularly, examples of the cracking active component may include zeolites, particularly Y-type zeolites optionally comprising a rare earth element, HY-type zeolites optionally comprising a rare earth element, ultrastable Y-type zeolite optionally comprising a rare earth element and β-type zeolite optionally comprising a rare earth element. These cracking active components may be used alone or in combination at any ratio. Examples of the support may include refractory inorganic oxides, natural clays, alumina, silica, and amorphous silica-alumina. These supports may be used alone or in combination at any ratio. In the present application, the contents of the cracking active component and the support are not particularly limited, and may be selected according to conventional knowledge in the art.

Step (3-5): optionally, the hydrotreated upgraded oil is subjected to catalytic cracking together with the atmospheric gas oil to obtain a second catalytic cracked product.

According to an aspect of the present application, in the step (3-5), the term "together" means that the hydrotreated upgraded oil and the atmospheric gas oil are used in combination as a feedstock for the catalytic cracking. For this reason, the two may be mixed in advance at a predetermined ratio and then subjected to catalytic cracking, or the two may be subjected to catalytic cracking simultaneously at a predetermined ratio, which is not particularly limited.

According to an aspect of the present application, in the step (3-5), the second catalytic cracked product may be further separated into dry gas, liquefied gas, gasoline, cycle oil, and slurry oil. Here, the separation may be carried out according to any method and in any manner known in the art, and examples thereof may include distillation and fractionation, especially fractionation. In addition, the separation may be carried out in any separation device (such as a fractionation column) known in the art, and a person skilled in the art can make a reasonable selection for this.

According to an aspect of the present application, in the step (3-5), the catalytic cracking may be carried out in any manner known in the art, and is not particularly limited. In addition, the catalytic cracking may be carried out in any catalytic cracking device (such as a fluidized bed reactor) known in the art, and a person skilled in the art can make a reasonable selection for this.

According to an aspect of the present application, in the step (3-5), the reaction temperature may be selected according to conventional knowledge in the art, but is generally in a range from 450° C. to 650° C., preferably from 480° C. to 560° C.

According to an aspect of the present application, in the step (3-5), the reaction pressure may be selected according to conventional knowledge in the art, but is generally in a range from 0.15 MPa to 0.4 MPa.

According to an aspect of the present application, in the step (3-5), the reaction time may be selected according to conventional knowledge in the art, but is generally in a range from 0.1 seconds to 10 seconds, preferably from 0.2 seconds to 4 seconds.

According to an aspect of the present application, in the step (3-5), the weight ratio of the cracking catalyst to the feedstock oil (referring to the hydrotreated upgraded oil and the atmospheric gas oil) may be selected according to conventional knowledge in the art, but is generally in a range from 3 to 30, preferably from 5 to 15.

According to an aspect of the present application, in the step (3-5), a weight ratio of steam to the feedstock oil (referring to the hydrotreated upgraded oil and the atmospheric gas oil) may be selected according to conventional knowledge in the art, but is generally in a range from 0.05 to 0.6, preferably from 0.05 to 0.4.

According to an aspect of the present application, in the step (3-5), the catalytic cracking is generally carried out in the presence of a cracking catalyst. Here, as the cracking catalyst, for example, any cracking catalyst conventionally used in the art for this purpose or any cracking catalyst produced according to any method conventionally known in the art may be mentioned, and is not particularly limited. Particularly, the cracking catalyst is generally a solid acid catalyst, and preferably comprises a cracking active component and a support. More particularly, examples of the cracking active component may include zeolites, particularly Y-type zeolites optionally comprising a rare earth element, HY-type zeolites optionally comprising a rare earth element, ultrastable Y-type zeolites comprising a rare earth element and β-type zeolites optionally comprising a rare earth element. These cracking active components may be used alone or in combination at any ratio. Examples of the support may include refractory inorganic oxides, natural clays, alumina, silica, and amorphous silica-alumina. These supports may be used alone or in combination at any ratio. In the present application, the contents of the cracking active component and the support are not particularly limited, and may be selected according to conventional knowledge in the art.

Step (3-6): optionally, the hydrotreated upgraded oil is subjected to catalytic cracking together with the second separated product to obtain a third catalytic cracked product.

According to an aspect of the present application, in the step (3-6), the term "together" means that the hydrotreated upgraded oil and the second separated product are used in combination as a feedstock for the catalytic cracking. For this reason, the two may be mixed in advance at a predetermined ratio and then subjected to catalytic cracking, or the two may be subjected to catalytic cracking simultaneously at a predetermined ratio, which is not particularly limited.

According to an aspect of the present application, in the step (3-6), the third catalytic cracked product may be further separated into dry gas, liquefied gas, gasoline, cycle oil, and slurry oil. Here, the separation may be carried out according to any method and in any manner known in the art, and examples thereof may include distillation and fractionation, especially fractionation. In addition, the separation may be carried out in any separation device (such as a fractionation column) known in the art, and a person skilled in the art can make a reasonable selection for this.

According to an aspect of the present application, in the step (3-6), the catalytic cracking may be carried out in any manner known in the art, and is not particularly limited. In addition, the catalytic cracking may be carried out in any catalytic cracking device (such as a fluidized bed reactor) known in the art, and a person skilled in the art can make a reasonable selection for this.

According to an aspect of the present application, in the step (3-6), the reaction temperature may be selected according to conventional knowledge in the art, but is generally in a range from 450° C. to 650° C., preferably from 480° C. to 560° C.

According to an aspect of the present application, in the step (3-6), the reaction pressure may be selected according to conventional knowledge in the art, but is generally in a range from 0.15 MPa to 0.4 MPa.

According to an aspect of the present application, in the step (3-6), the reaction time may be selected according to conventional knowledge in the art, but is generally in a range from 0.1 seconds to 10 seconds, preferably from 0.2 seconds to 4 seconds.

According to an aspect of the present application, in the step (3-6), the weight ratio of the cracking catalyst to the feedstock oil (referring to the hydrotreated upgraded oil and the second separated product) may be selected according to conventional knowledge in the art, but is generally in a range from 3 to 30, preferably from 5 to 15.

According to an aspect of the present application, in the step (3-6), a weight ratio of steam to the feedstock oil (referring to the hydrotreated upgraded oil and the second separated product) may be selected according to conventional knowledge in the art, but is generally in a range from 0.05 to 0.6, preferably from 0.05 to 0.4.

According to an aspect of the present application, in the step (3-6), the catalytic cracking is generally carried out in the presence of a cracking catalyst. Here, as the cracking catalyst, for example, any cracking catalyst conventionally used in the art for this purpose or any cracking catalyst produced according to any method conventionally known in the art may be mentioned, and is not particularly limited. Particularly, the cracking catalyst is generally a solid acid catalyst, and preferably comprises a cracking active component and a support. More particularly, examples of the cracking active component may include zeolites, particularly Y-type zeolites optionally comprising a rare earth element, HY-type zeolites optionally comprising a rare earth element, ultrastable Y-type zeolites comprising a rare earth element and β-type zeolites optionally comprising a rare earth element. These cracking active components may be used alone or in combination at any ratio. Examples of the support may include refractory inorganic oxides, natural clays, alumina, silica, and amorphous silica-alumina. These supports may be used alone or in combination at any ratio. In the present application, the contents of the cracking active component and the support are not particularly limited, and may be selected according to conventional knowledge in the art.

Step (3-7): optionally, the atmospheric gas oil is subjected to a hydrotreatment to obtain diesel oil.

According to an aspect of the present application, in the step (3-7), the hydrotreatment may be carried out in any manner known in the art, and is not particularly limited. In addition, the hydrotreatment may be carried out in any hydrotreatment device (such as a fixed-bed reactor, a fluidized-bed reactor) known in the art, and a person skilled in the art may make a reasonable selection for this.

According to an aspect of the present application, in the step (3-7), the hydrogen partial pressure may be selected according to conventional knowledge in the art, but is generally in a range from 7.0 MPa to 15.0 MPa.

According to an aspect of the present application, in the step (3-7), the reaction pressure may be selected according to conventional knowledge in the art, but is generally in a range from 8 MPa to 12 MPa.

According to an aspect of the present application, in the step (3-7), the reaction temperature may be selected according to conventional knowledge in the art, but is generally in a range from 340° C. to 400° C.

According to an aspect of the present application, in the step (3-7), the volumetric space velocity of the atmospheric gas oil may be selected according to conventional knowledge in the art, but is generally in a range from 0.6 $h^{-1}$ to 1.5 $h^{-1}$.

According to an aspect of the present application, in the step (3-7), the volume ratio of hydrogen to the atmospheric gas oil may be selected according to conventional knowledge in the art, but is generally in a range from 500 to 800.

According to an aspect of the present application, in the step (3-7), the hydrotreatment is generally carried out in the presence of a hydrogenation catalyst. Here, as the hydrogenation catalyst, for example, any hydrogenation catalyst conventionally used in the art for this purpose or any hydrogenation catalyst produced according to any method conventionally known in the art may be mentioned, and the amount of the hydrogenation catalyst used in the step may be selected according to the conventional knowledge in the art, and is not particularly limited. Particularly, the hydrogenation catalyst generally comprises a support and an active metal component. More particularly, examples of the active metal component may include metals of Group VIB of the Periodic Table of the Elements and non-noble metals of Group VIII of the Periodic Table of the Elements, especially combinations of nickel and tungsten, combinations of nickel, tungsten and cobalt, combinations of nickel and molybdenum, or combinations of cobalt and molybdenum. These active metal components may be used alone or in combination at any ratio. Examples of the support may include alumina, silica, and amorphous silica-alumina. These supports may be used alone or in combination at any ratio. In the present application, the contents of the support and the active metal component are not particularly limited, and may be selected according to conventional knowledge in the art.

Step (3-8): optionally, the cycle oil obtained in any step of the upgrading process is subjected to a hydrotreatment together with the upgraded oil to obtain a hydrotreated oil.

According to an aspect of the present application, in the step (3-8), the term "together" means that the cycle oil and the upgraded oil are used in combination as a feedstock for the hydrotreatment. For this reason, the two may be mixed in advance at a predetermined ratio and then subjected to the hydrotreatment, or the two may be subjected to the hydrotreatment simultaneously at a predetermined ratio, which is not particularly limited.

According to an aspect of the present application, in the step (3-8), the hydrotreatment may be carried out in any manner known in the art, and is not particularly limited. In addition, the hydrotreatment may be carried out in any hydrotreatment device (such as a fixed-bed reactor, a fluidized-bed reactor) known in the art, and a person skilled in the art may make a reasonable selection for this.

According to an aspect of the present application, in the step (3-8), the hydrogen partial pressure may be selected according to conventional knowledge in the art, but is generally in a range from 5.0 MPa to 20.0 MPa, preferably from 8.0 MPa to 15.0 MPa.

According to an aspect of the present application, in the step (3-8), the reaction temperature may be selected according to conventional knowledge in the art, but is generally in a range from 330° C. to 450° C., preferably from 350° C. to 420° C.

According to an aspect of the present application, in the step (3-8), the volumetric space velocity of the feedstock oil (referring to the cycle oil and the upgraded oil) may be selected according to conventional knowledge in the art, but is generally in a range from 0.1 h$^{-1}$ to 3.0 preferably from 0.3 h$^{-1}$ to 1.5 h$^{-1}$.

According to an aspect of the present application, in the step (3-8), the volume ratio of hydrogen to the feedstock oil (referring to the cycle oil and the upgraded oil) may be selected according to conventional knowledge in the art, but is generally in a range from 300 to 3000, preferably from 800 to 1500.

According to an aspect of the present application, in the step (3-8), the hydrotreatment is generally carried out in the presence of a hydrogenation catalyst. Here, as the hydrogenation catalyst, for example, any hydrogenation catalyst conventionally used in the art for this purpose or any hydrogenation catalyst produced according to any method conventionally known in the art may be mentioned, and the amount of the hydrogenation catalyst used in the step may be selected according to the conventional knowledge in the art, and is not particularly limited. Particularly, the hydrogenation catalyst generally comprises a support and an active metal component. More particularly, examples of the active metal component may include metals of Group VIB of the Periodic Table of the Elements and non-noble metals of Group VIII of the Periodic Table of the Elements, especially combinations of nickel and tungsten, combinations of nickel, tungsten and cobalt, combinations of nickel and molybdenum, or combinations of cobalt and molybdenum. These active metal components may be used alone or in combination at any ratio. Examples of the support may include alumina, silica, and amorphous silica-alumina. These supports may be used alone or in combination at any ratio. In the present application, the contents of the support and the active metal component are not particularly limited, and may be selected according to conventional knowledge in the art.

Step (3-9): optionally, the hydrotreated oil is subjected to catalytic cracking together with the second separated product to obtain a fourth catalytic cracked product.

According to an aspect of the present application, in the step (3-9), the term "together" means that the hydrotreated oil and the second separated product are used in combination as a feedstock for the catalytic cracking. For this reason, the two may be mixed in advance at a predetermined ratio and then subjected to catalytic cracking, or the two may be subjected to catalytic cracking simultaneously at a predetermined ratio, which is not particularly limited.

According to an aspect of the present application, in the step (3-9), the fourth catalytic cracked product may be further separated into dry gas, liquefied gas, gasoline, cycle oil, and slurry oil. Here, the separation may be carried out according to any method and in any manner known in the art, and examples thereof may include distillation and fractionation, especially fractionation. In addition, the separation may be carried out in any separation device (such as a fractionation column) known in the art, and a person skilled in the art can make a reasonable selection for this.

According to an aspect of the present application, in the step (3-9), the catalytic cracking may be carried out in any manner known in the art, and is not particularly limited. In addition, the catalytic cracking may be carried out in any catalytic cracking device (such as a fluidized bed reactor) known in the art, and a person skilled in the art can make a reasonable selection for this.

According to an aspect of the present application, in the step (3-9), the reaction temperature may be selected according to conventional knowledge in the art, but is generally in a range from 450° C. to 650° C., preferably from 480° C. to 560° C.

According to an aspect of the present application, in the step (3-9), the reaction pressure may be selected according to conventional knowledge in the art, but is generally in a range from 0.15 MPa to 0.4 MPa.

According to an aspect of the present application, in the step (3-9), the reaction time may be selected according to conventional knowledge in the art, but is generally in a range from 0.1 seconds to 10 seconds, preferably from 0.2 seconds to 4 seconds.

According to an aspect of the present application, in the step (3-9), the weight ratio of the cracking catalyst to the feedstock oil (referring to the hydrotreated oil and the second separated product) may be selected according to conventional knowledge in the art, but is generally in a range from 3 to 30, preferably from 5 to 15.

According to an aspect of the present application, in the step (3-9), a weight ratio of steam to the feedstock oil (referring to the hydrotreated oil and the second separated product) may be selected according to conventional knowledge in the art, but is generally in a range from 0.05 to 0.6, preferably from 0.05 to 0.4.

According to an aspect of the present application, in the step (3-9), the catalytic cracking is generally carried out in the presence of a cracking catalyst. Here, as the cracking catalyst, for example, any cracking catalyst conventionally used in the art for this purpose or any cracking catalyst produced according to any method conventionally known in the art may be mentioned, and is not particularly limited. Particularly, the cracking catalyst is generally a solid acid catalyst, and preferably comprises a cracking active component and a support. More particularly, examples of the cracking active component may include zeolites, particularly Y-type zeolites optionally comprising a rare earth element, HY-type zeolites optionally comprising a rare earth element, ultrastable Y-type zeolites comprising a rare earth element and β-type zeolites optionally comprising a rare earth element. These cracking active components may be used alone or in combination at any ratio. Examples of the support may include refractory inorganic oxides, natural clays, alumina, silica, and amorphous silica-alumina. These supports may be used alone or in combination at any ratio. In the present application, the contents of the cracking active component and the support are not particularly limited, and may be selected according to conventional knowledge in the art.

Step (3-10): optionally, the slurry oil obtained in any step of the upgrading process and/or an externally supplied slurry oil is recycled to the step (1), step (2) and/or step (3).

According to an aspect of the present application, in the step (3-10), the expression "externally supplied slurry oil" refers to the slurry oil that is not derived from any step of the upgrading process of the present application, but is derived from other sources (such as delivered or purchased from external source).

According to an aspect of the present application, in the step (3-10), by recycling the slurry oil as described, at least the operation stability of the upgrading process can be improved, or in a preferred case, at least the yield of the upgraded oil can be further improved.

According to an aspect of the present application, in the step (3-10), as the recycle manner of the slurry oil, for example, the slurry oil may be recycled to the step (1), and then subjected to the conversion reaction together with the low-quality oil as the upgrading feedstock, or the slurry oil may be recycled to the step (2) and mixed with the conversion product at a predetermined ratio, so as to conduct a component blending on the conversion product, or the slurry oil may be recycled to the step (3), so that the extraction separation is carried out in the presence of the slurry oil. These manners may be used alone or in combination.

Step (3-11): optionally, the liquefied gas obtained in any step of the upgrading process is recycled to the step (3).

According to an aspect of the present application, in the step (3-11), the liquefied gas is recycled to the step (3), including the step (3-1), as the solvent or a part of the solvent. According to an aspect of the present application, the upgrading process may optionally further comprise the following step (4).

Step (4): all of or a part of the pitch is recycled to the step (1) (hereinafter referred to as pitch recycling step).

According to an aspect of the present application, in the step (4), a part of the pitch (for example more than 80 wt %, preferably more than 90 wt %, and more preferably at least 95 wt %) may be recycled to the step (1), and subjected to the conversion reaction together with the low-quality oil as an upgrading feedstock, and the rest is discarded. The proportion of the pitch discarded to the total residue is referred to as the pitch discarded rate, of which the unit is wt %.

According to the present application, there is also provided an upgrading system. Since the upgrading system is specifically designed to carry out the upgrading process according to the present application, any feature, term, characteristic, or limitation of the upgrading system that is not specifically described or explained in the context of the present application can be conceived with reference to the corresponding description or explanation made for the upgrading process in the context of the present application. In addition, one or more aspects (or embodiments) disclosed in the context of the present specification with respect to the upgrading process and one or more aspects (or embodiments) disclosed in the context of the present application with respect to the upgrading system may be arbitrarily combined with each other, and the resulted technical solution (such as a process or a system) belongs to a part of the original disclosure, and also falls within the scope of the present application.

According to an aspect of the present application, the upgrading system comprises a conversion reaction unit, a conversion product processing unit, a first control unit, and an extraction separation unit.

According to an aspect of the present application, in the upgrading system, the conversion reaction unit is configured to conduct a conversion reaction of a low-quality oil in the presence of hydrogen and optionally in the presence of a conversion catalyst, and discharge the resulted conversion product. Here, examples of the conversion reaction unit may include a hydro-thermal conversion reactor.

According to an aspect of the present application, in the upgrading system, the conversion product processing unit is configured to process the conversion product and discharge the resulted first processed product. Here, examples of the conversion product processing unit may include a flash tank, a fractionation column, and a distillation column.

According to an aspect of the present application, in the upgrading system, the first control unit is configured to control the operating conditions (such as operating temperature and/or operating pressure) of the conversion product processing unit such that the first processed product comprises from 20 wt % to 60 wt % of a component having a boiling point or boiling range between 350° C. and 524° C. Examples of the first control unit may include a temperature control device and a pressure control device.

According to an aspect of the present application, in the upgrading system, the extraction separation unit is configured to conduct an extraction separation of the first processed product, and discharge the resulted upgraded oil and pitch, separately. Examples of the extraction separation unit may include an extraction column.

According to an aspect of the present application, the upgrading system may optionally further comprise a pitch processing unit. The pitch processing unit is configured to transport all or a part of the pitch to the conversion reaction unit. Here, examples of the pitch processing unit may include a pump and a transport pipeline.

According to an aspect of the present application, in the upgrading system, the conversion product processing unit may further comprise a first conversion product separation unit, a second conversion product separation unit, an optional second separated product separation unit, and an optional gas component transport unit.

According to an aspect of the present application, in the upgrading system, the first conversion product separation unit is configured to separate the conversion product and discharge the resulted gas component and liquid component, separately. Examples of the first conversion product separation unit may include a pressure distillation column.

According to an aspect of the present application, in the upgrading system, the second conversion product separation unit is configured to separate the liquid component and discharge the resulted second separated product and the first separated product, separately.

Examples of the second conversion product separation unit may include a flash tank and an atmospheric distillation column.

According to an aspect of the present application, in the upgrading system, the second separated product separation unit is configured to separate the second separated product and discharge the resulted naphtha and atmospheric gas oil, separately. Examples of the second separated product separation unit may include a fractionation column.

According to an aspect of the present application, in the upgrading system, the gas component transport unit is configured to transport the gas component to the conversion reaction unit. Examples of the gas component transport unit may include a gas transport pipeline.

According to an aspect of the present application, the upgrading system may further comprise a second control unit and a third control unit.

According to an aspect of the present application, in the upgrading system, the second control unit is configured to control the operating pressure of the first conversion product separation unit, and the third control unit is configured to control the operating pressure of the second conversion product separation unit, so that the operating pressure of the first conversion product separation unit is greater than the operating pressure of the second conversion product separation unit. Examples of the second control unit may include a pressure control device and system. Examples of the third control unit may include a pressure control device and system.

According to an aspect of the present application, in the upgrading system, the third control unit may be configured to control the operating conditions (such as operating temperature and/or operating pressure) of the second conversion product separation unit, so that the first separated product comprises from 20 wt % to 60 wt % of a component having a boiling point or boiling range between 350° C. and 524° C., and the second separated product or any component thereof has a final boiling point of less than or equal to 350° C. Examples of the third control unit may include a pressure control device and system or a temperature control device and system.

According to an aspect of the present application, in the upgrading system, for convenience of operation and measurement, it is preferable that the second control unit is configured to control the outlet pressure and/or outlet temperature of the gas component of the first conversion product separation unit, and the third control unit is configured to control the outlet pressure and/or outlet temperature of the second separated product of the second conversion product separation unit.

According to an aspect of the present application, in the upgrading system, the extraction separation unit is configured to contact the first separated product or the first processed product with a solvent, and discharge the resulted upgraded oil and the pitch, separately. Examples of the extraction separation unit may include an extraction column.

According to an aspect of the present application, the upgrading system may optionally further comprise one or more of the following units.

A first hydrogenation unit is configured to conduct a hydrotreating on the upgraded oil and discharge the resulted hydrotreated upgraded oil. Examples of the first hydrogenation unit may include a fixed-bed hydrogenation reactor.

A second hydrogenation unit is configured to conduct hydrocracking of the upgraded oil, and separate the resulted hydrocracked product into dry gas, liquefied gas, aviation kerosene, diesel oil, and hydrogenated tail oil. Examples of the second hydrogenation unit may include a fixed-bed hydrocracking reactor.

A first catalytic cracking unit is configured to conduct catalytic cracking of the hydrotreated upgraded oil, and separate the resulted first catalytic cracked product into dry gas, liquefied gas, gasoline, cycle oil, and slurry oil. Here, as the first catalytic cracking unit, for example, a fluidized bed catalytic cracking reactor may be mentioned.

A second catalytic cracking unit is configured to conduct catalytic cracking of the hydrotreated upgraded oil along with the atmospheric gas oil, and separate the resulted second catalytic cracked product into dry gas, liquefied gas, gasoline, cycle oil and slurry oil. Here, as the second catalytic cracking unit, for example, a fluidized bed catalytic cracking reactor may be mentioned.

A third catalytic cracking unit is configured to conduct catalytic cracking of the hydrotreated upgraded oil along with the second separated product, and separate the resulted third catalytic cracked product into dry gas, liquefied gas, gasoline, cycle oil and slurry oil. Here, as the third catalytic cracking unit, for example, a fluidized bed catalytic cracking reactor may be mentioned.

A third hydrogenation unit is configured to conduct a hydrotreating on the atmospheric gas oil and discharge the resulted diesel oil. Examples of the third hydrogenation unit may include a fixed-bed hydrogenation reactor.

A fourth hydrogenation unit is configured to conduct a hydrotreating on the cycle oil obtained in any unit of the upgrading system along with the upgraded oil, and discharge the resulted hydrotreated oil. Examples of the fourth hydrogenation unit may include a fixed-bed hydrogenation reactor.

A fourth catalytic cracking unit is configured to conduct catalytic cracking of the hydrotreated oil along with the second separated product, and separate the resulted fourth catalytic cracked product into dry gas, liquefied gas, gasoline, cycle oil and slurry oil. Here, as the fourth catalytic cracking unit, for example, a fluidized bed catalytic cracking reactor may be mentioned.

A slurry oil transport unit is configured to transport the slurry oil obtained in any unit of the upgrading system and/or an externally supplied slurry oil to the conversion reaction unit, the conversion product processing unit and/or the extraction separation unit. Examples of the slurry oil transport unit may include a transport pipeline and a pump.

A liquefied gas transport unit is configured to transport the liquefied gas obtained in any unit of the upgrading system to the extraction separation unit. Examples of the liquefied gas transport unit may include a gas transport pipeline.

In the following description, the upgrading process and the upgrading system of the present application will be further illustrated with reference to the drawings, but the present application is not limited thereto.

As shown in FIG. 1, a low-quality oil used as an upgrading feedstock is passed through a pipeline 1, a conversion catalyst is passed through a pipeline 2, a recycling hydrogen is passed through a pipeline 3, fresh hydrogen is passed through a pipeline 4, and a pitch is passed through a pipeline 5 to a conversion reaction unit 7 for conversion reaction. The conversion product is transported to the first conversion product separation unit 9 through pipeline 8 for pressure distillation, and is separated into a gas component and a liquid component. The gas component is then sent to the conversion reaction unit 7 as the recycling hydrogen through pipeline 10, pipeline 3, and pipeline 6, or is led out of the system through pipeline 10 and pipeline 11. The liquid component is transported to the second conversion product separation unit 13 through pipeline 12 for pressure drop, and is separated into a second separated product and a first separated product. The second separated product is led out of the system through pipeline 15 and the first separated product is transported to the extraction separation unit 16 through pipeline 14 for extraction separation via countercurrent contact with a solvent from pipeline 17 to obtain an upgraded oil and a pitch. The upgraded oil is led out of the system through pipeline 18, and a part of the pitch is discarded through pipeline 19 and pipeline 20, and the rest is recycled as the upgrading feedstock through pipeline 19, pipeline 5, and pipeline 6 to the conversion reaction unit 7 for conversion reaction together with the low-quality oil. Alternatively, all of the pitch may be discarded through pipeline 19 and pipeline 20 without being recycled.

Figure 2:
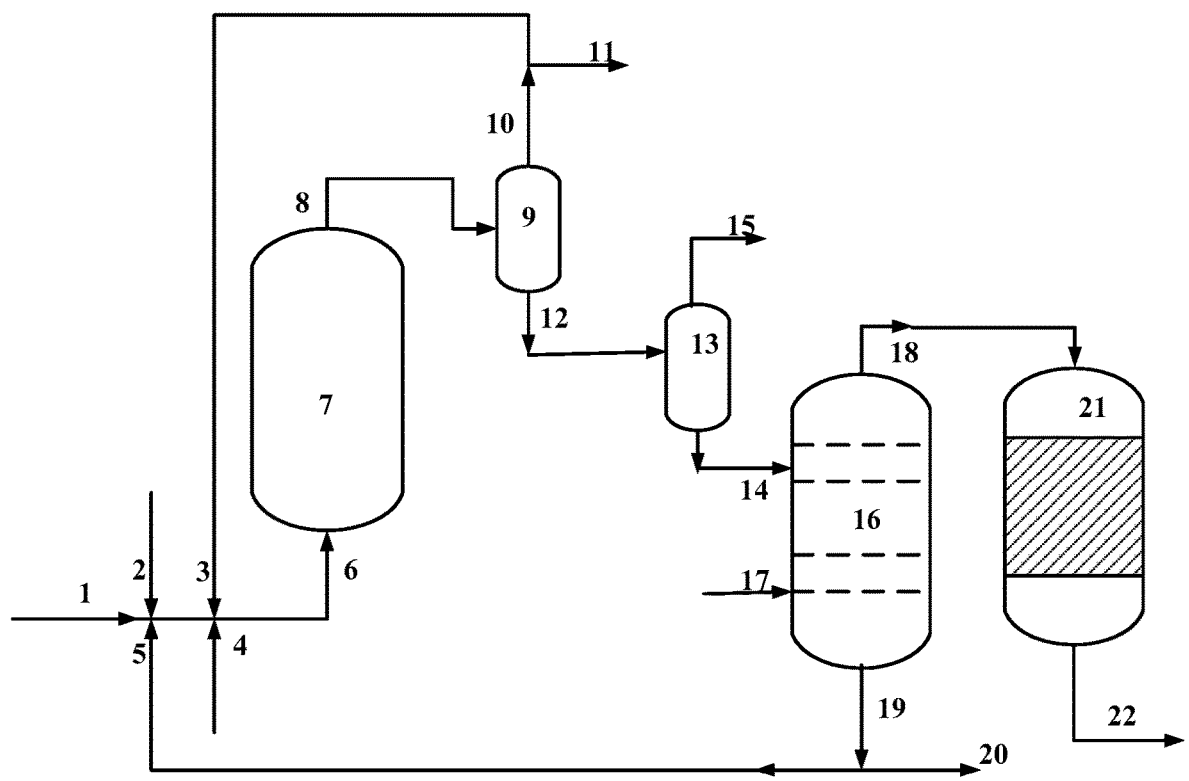
FIG. 2 schematically illustrates the process for upgrading low-quality oils according to another embodiment of the present application.

As shown in FIG. 2, on the basis of FIG. 1, (1) The upgraded oil is sent to the first hydrogenation unit 21 through pipeline 18 for further hydrotreatment, to obtain a hydrotreated upgraded oil 22 with further improved quality.

Figure 3:
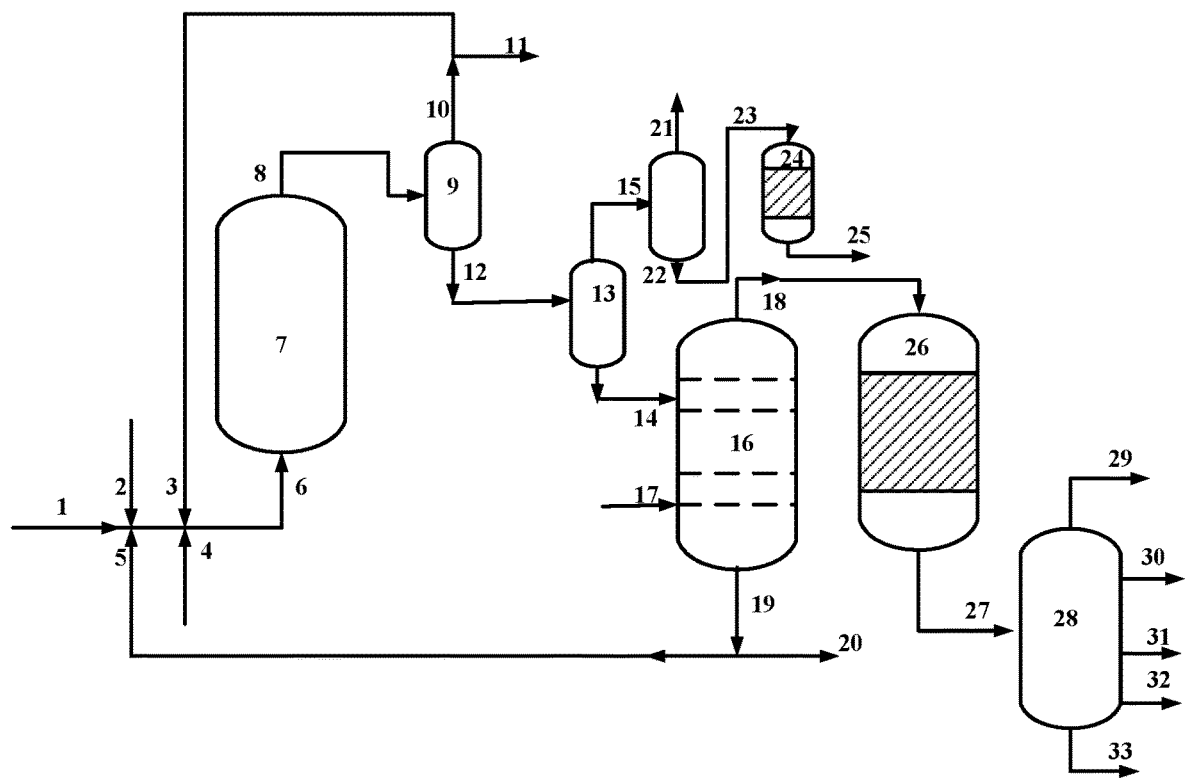
FIG. 3 schematically illustrates the process for upgrading low-quality oils according to another embodiment of the present application.

As shown in FIG. 3, on the basis of FIG. 1, (1) The second separated product is transported to the second separated product separation unit through pipeline 15 for fractionation to obtain naphtha and atmospheric gas oil (AGO). Naphtha is led out of the system through pipeline 21, and AGO is transported to the third hydrogenation unit 24 through pipeline 22 and pipeline 23 for hydrotreatment, to obtain a high-quality diesel oil satisfying the Chinese National V Standard, and the high-quality diesel oil is led out of the system through pipeline 25;

(2) The upgraded oil is transported to the second hydrogenation unit 26 through pipeline 18 for hydrocracking redaction to obtain a hydrocracked product, and the hydrocracked product is transported to the fractionation system 28 through pipeline 27 for separation to obtain dry gas, liquefied gas, aviation kerosene satisfying the Chinese National Standard, high-quality diesel oil and hydrogenated tail oil. The dry gas, liquefied gas, aviation kerosene satisfying the Chinese National Standard, high-quality diesel oil, and hydrogenated tail oil are led out of the system through pipelines 29, 30, 31, 32, and 33, respectively; and (3) The hydrogenated tail oil can be used as feedstock for ethylene production via steam cracking.

Figure 4:
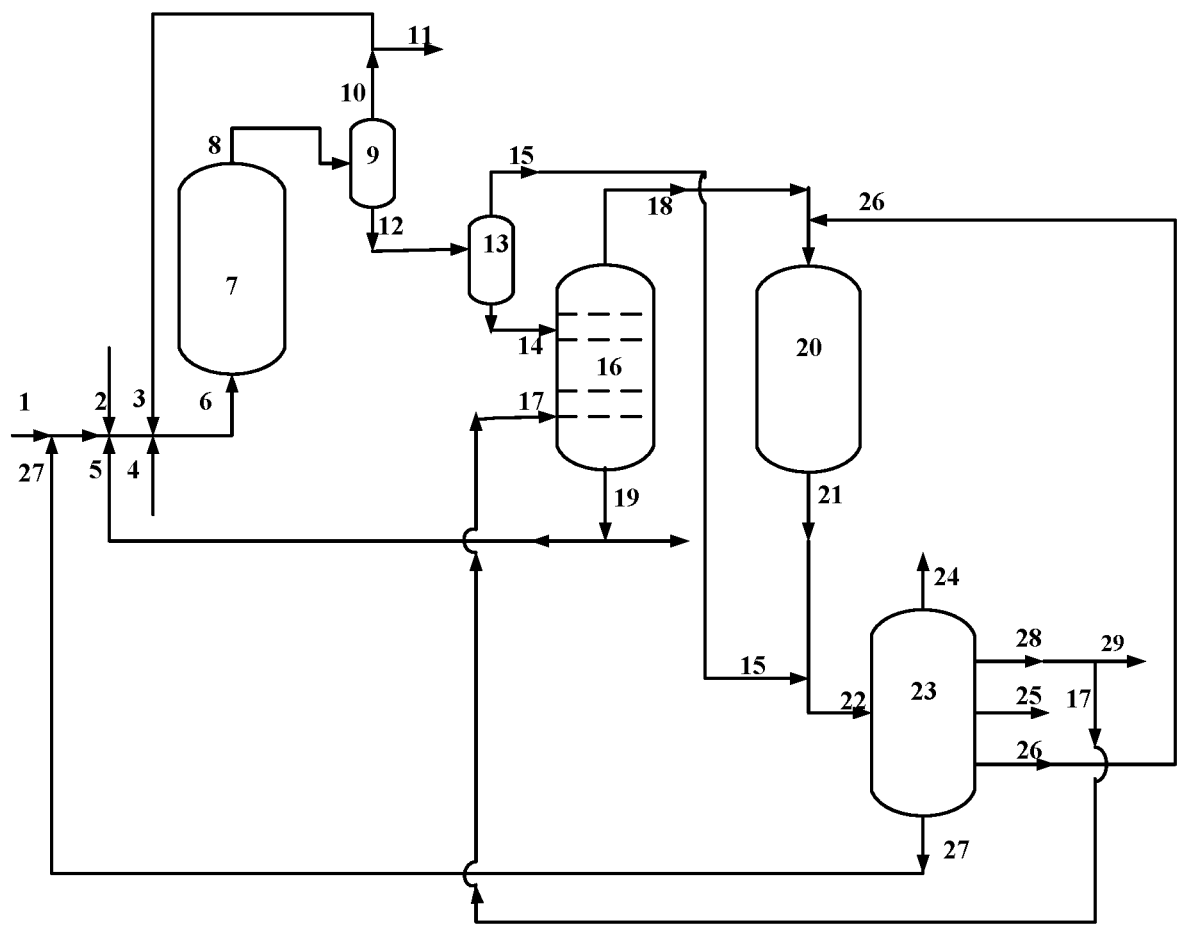
FIG. 4 schematically illustrates the process for upgrading low-quality oils according to another embodiment of the present application.

As shown in FIG. 4, on the basis of FIG. 1, (1) The upgraded oil is passed through pipeline 18 and the cycle oil is passed through pipeline 26 to the fourth hydrogenation unit 20 for combined hydrotreatment to obtain a hydrotreated oil with further improved quality;

(2) The hydrotreated oil is passed through pipeline 21 and pipeline 22, and the second separated product is passed through pipeline 15 and pipeline 22 to the fourth catalytic cracking unit 23 for combined catalytic cracking. The catalytic cracked product is separated to obtain dry gas, liquefied gas, high-octane gasoline, cycle oil and slurry oil;

(3) The dry gas is led out of the system through pipeline 24, a part of the liquefied gas is recycled to the extraction separation unit 16 as a solvent through pipeline 28 and pipeline 17. The other part of the liquefied gas is led out of the system through pipeline 28 and pipeline 29. The high-octane gasoline is led out of the system through pipeline 25 as a product;

(4) The slurry oil is recycled to the conversion reaction unit 7 through pipeline 27 and pipeline 6 as the upgrading feedstock for conversion reaction together with the low-quality oil.

EXAMPLES

Hereinafter, the present application will be described in detail with reference to the working examples, but the present application is not limited thereto.

In the context of the present application, including the following examples and comparative examples:

The content of the heavy metal (calculated based on Ni+V) is determined according to ASTM D5708;

The content of asphaltenes is determined according to SH/T 0266-92 (1998);

Conversion rate of low-quality oil=(1−pitch discarded rate)×100%;

Pitch discarded rate=mass of the pitch discarded/mass of the upgrading feedstock×100%;

Yield of the upgraded oil=mass of the upgraded oil/mass of the upgrading feedstock×100%;

Yield of toluene-insoluble=mass of the toluene-insoluble/mass of the upgrading feedstock×100%;

Yield of gasoline=mass of the gasoline/mass of the catalytic cracking feedstock oil×100%;

Yield of aviation kerosene=mass of the aviation kerosene/mass of the hydrocracking feedstock oil×100%;

Yield of diesel oil=mass of the diesel oil/mass of the hydrocracking feedstock oil×100%.

The cetane number of the diesel oil is determined according to GB T386-2010 standard method.

The operation stability of the upgrading process is evaluated by the number of days of stable operation of the upgrading system. Particularly, if any of the followings occurs in the upgrading system, the operation of the system is deemed unstable: (1) the maximum deviation $\Delta T$ (absolute value) of the temperatures measured at different points inside the conversion reactor is greater than 5° C.; and (2) the color of the upgraded oil is black, which under normal conditions should be yellow or yellow-green.

The following examples and comparative examples were carried out in a manner similar to those described in the drawings.

In the following examples and comparative examples, as the low-quality oil, the upgrading feedstock A and the upgrading feedstock B were vacuum residues, the upgrading feedstock C was vacuum residue of Venezuelan extra heavy oil, the upgrading feedstock D was high-temperature coke-oven coal tar, and the upgrading feedstock E was deoiled asphalt. The properties of these five low-quality oils are shown in Table 1.

TABLE 1

| Name | Upgrading feedstock A | Upgrading feedstock B | Upgrading feedstock C | Upgrading feedstock D | Upgrading feedstock E |
|---|---|---|---|---|---|
| Density (20° C.)/(kg/m$^3$) | 1064.4 | 1060.3 | 1064 | 1083.0 | 1125.0 |
| API | 1.44 | 1.95 | 1.49 | <0 | <0 |
| Conradson Carbon residue/% | 26.3 | 23.2 | 33.0 | 5.5 | 46.0 |
| w (Carbon)/% | 84.20 | 83.87 | 85.84 | 84.73 | 83.62 |
| w (Hydrogen)/% | 9.77 | 9.98 | 9.38 | 10.52 | 8.67 |
| w (Sulfur)/% | 5.50 | 4.90 | 3.20 | 0.14 | 6.5 |
| w (Oxygen)/% | | | | 3.47 | |
| w (Nitrogen)/% | 0.38 | 0.34 | 0.69 | 0.47 | 0.29 |
| w (Four-component composition)/% | | | | | |
| Saturates | 8.6 | 9.0 | 10.1 | 36.6 | 0.7 |
| Aromatics | 51.9 | 53.6 | 38.3 | 21.2 | 27.8 |
| Resins | 25.3 | 24.4 | 26.5 | 37.6 | 29.6 |
| Asphaltenes | 14.2 | 12.7 | 25.1 | 4.6 | 41.9 |
| w (Metal)/(μg/g) | | | | | |
| Ca | 1.6 | 2.4 | 33.0 | 6.8 | 34 |
| Fe | 9.4 | 23.0 | 15.0 | 78.3 | 45 |
| Ni | 69.7 | 42.0 | 147.0 | 0.5 | 104 |
| V | 230.0 | 96.0 | 621.0 | <0.1 | 326 |
| Content of >500° C. component/% | 100 | >97 | 100 | 15 | 100 |

Examples 1-5

On a pilot plant, a low-quality oil was first subjected to a conversion reaction, and then the conversion product was processed to obtain a first separated product and a second separated product. The operating conditions and results of the conversion reaction and the processing of the conversion product are listed in Table 2.

TABLE 2

| Item | Example 1 | Example 2 | Example 3 | Example 4 | Example 5 |
|---|---|---|---|---|---|
| Upgrading feedstock | Upgrading feedstock A | Upgrading feedstock A | Upgrading feedstock B | Upgrading feedstock B | Upgrading feedstock D |
| Conversion reaction | | | | | |
| Reaction temperature/° C. | 410 | 420 | 425 | 430 | 440 |
| Reaction pressure/MPa | 16 | 20 | 18 | 17 | 14 |
| Conversion catalyst | Molybdenum naphthenate + Nickel naphthenate | Hematite | Ammonium molybdate | Red mud | Organic molybdenum + Organic vanadium |
| Volumetric space velocity/h$^{-1}$ | 0.2 | 1.0 | 0.15 | 0.5 | 0.6 |
| Amount of catalyst/(μg/g) | 100 | 15000 | 10000 | 20000 | 200 |
| Hydrogen partial pressure/MPa | 15 | 19 | 17.4 | 15.8 | 17 |
| Volume ratio of hydrogen to upgrading feedstock | 1200 | 1500 | 1300 | 2000 | 1000 |
| Processing of conversion product | | | | | |
| First pressure/MPa | 16 | 20 | 18 | 17 | 18 |
| First temperature/° C. | 405 | 415 | 410 | 420 | 430 |
| Second pressure/MPa | 0.1 | 0.5 | 1.5 | 4.0 | 0.2 |
| Second temperature/° C. | 300 | 350 | 320 | 380 | 330 |
| Product distribution/wt % | | | | | |
| Gas component | 8.5 | 8.8 | 9.0 | 9.5 | 9.0 |
| First separated product | 68.2 | 61.5 | 57.7 | 55.3 | 22.2 |
| Boiling range of special component in first separated product/° C. | 350~460 | 360~480 | 355~490 | 400~490 | 350~500 |

TABLE 2-continued

| Item | Example 1 | Example 2 | Example 3 | Example 4 | Example 5 |
|---|---|---|---|---|---|
| Content of special component in first separated product/wt % | 38 | 40 | 44 | 29 | 48 |
| Initial boiling point of first separated product/° C. | 300 | 321 | 306 | 334 | 308 |
| Second separated product | 25.4 | 31.8 | 35.5 | 36.7 | 71.6 |
| Final boiling point of second separated product/° C. | 308 | 346 | 324 | 342 | 335 |

Examples 6-8

On a pilot plant, a low-quality oil was first subjected to a conversion reaction, and then the conversion product was processed to obtain a first separated product and a second separated product. The operating conditions and results of the conversion reaction and the processing of the conversion product are listed in Table 3.

TABLE 3

| Item | Example 6 | Example 7 | Example 8 |
|---|---|---|---|
| Upgrading feedstock | Upgrading feedstock B (80%) + Upgrading feedstock D (20%) | Upgrading feedstock C | Upgrading feedstock E |
| Conversion reaction | | | |
| Reaction temperature/° C. | 440 | 420 | 425 |
| Reaction pressure/MPa | 17 | 18 | 20 |
| Conversion catalyst | Hematite | Molybdenum naphthenate + Nickel naphthenate | Ammonium molybdate |
| Volumetric space velocity/h$^{-1}$ | 0.5 | 0.4 | 0.15 |
| Amount of catalyst/(μg/g) | 12000 | 150 | 8000 |
| Hydrogen partial pressure/MPa | 16.6 | 17.1. | 19.4 |
| Volume ratio of hydrogen to upgrading feedstock | 1500 | 1200 | 1000 |
| Processing of conversion product | | | |
| First pressure/MPa | 17 | 18 | 20 |
| First temperature/° C. | 430 | 410 | 415 |
| Second pressure/MPa | 0.1 | 0.5 | 1.5 |
| Second temperature/° C. | 360 | 340 | 350 |
| Product distribution/wt % | | | |
| Gas component | 11.3 | 9.8 | 10.6 |
| First separated product | 46.9 | 58.3 | 56.8 |
| Boiling range of special component in first separated product/° C. | 400~480 | 385~465 | 370~470 |
| Content of special component in first separated product/wt % | 28 | 36 | 39 |
| Initial boiling point of first separated product/° C. | 342 | 328 | 335 |
| Second separated product | 43.9 | 34.5 | 35.4 |
| Final boiling point of second separated product/° C. | 345 | 326 | 332 |

Examples 9-11

On a pilot plant, the first separated products obtained in Examples 2, 4, and 7 were subjected to extraction separation, respectively. The operating conditions and results of the extraction separation are shown in Table 4.

TABLE 4

| Item | Example 9 | Example 10 | Example 11 |
|---|---|---|---|
| Source of first separated product | Example 2 | Example 4 | Example 7 |
| Extraction separation | | | |
| Solvent | i-C$_4$H$_8$ | n-C$_4$H$_8$ | FCC liquefied gas |
| Third temperature/° C. | 120 | 130 | 120 |
| Solvent weight ratio | 3 | 2.5 | 4 |
| Third pressure/MPa | 5.0 | 4.0 | 10 |
| Product distribution/wt % | | | |
| Upgraded oil | 42.4 | 48.4 | 41.6 |
| Pitch | 57.6 | 51.5 | 58.4 |
| Properties of pitch | | | |
| Softening point/° C. | 110 | 118 | 101 |

Examples 12-13

On a pilot plant, a low-quality oil was used as the upgrading feedstock for a conversion reaction, and then the conversion product was processed to obtain a first separated product and a second separated product. The first separated product was subjected to extraction separation to obtain an upgraded oil and a pitch. A part of the pitch was recycled to the conversion reaction, and used as an upgrading feedstock for the conversion reaction after being mixed with the low-quality oil, and the rest of the pitch was discarded. The conversion product derived from the low-quality oil+pitch was processed to obtain a first separated product and a second separated product. The first separated product was subjected to extraction separation to obtain an upgraded oil and a pitch. The second separated product was separated to obtain a naphtha fraction and an atmospheric gas oil. The operating conditions and results of each step are listed in Table 5.

TABLE 5

| Item | Example 12 | Example 13 |
|---|---|---|
| Upgrading feedstock | Upgrading feedstock B + Pitch | Upgrading feedstock C + Pitch |
| Source of pitch | Itself (Example 12) | Itself (Example 13) |
| Recycle ratio of pitch/% | 95 | 90 |
| Boiling range of special component in first separated product/° C. | 400~500 | 380~430 |
| Content of special component in first separated product/wt % | 40 | 25 |
| Conversion reaction | | |
| Reaction temperature/° C. | 430 | 420 |
| Reaction pressure/MPa | 18 | 19 |
| Conversion catalyst | Ammonium molybdate | Molybdenum naphthenate + Nickel naphthenate |
| Volumetric space velocity/$h^{-1}$ | 0.2 | 0.4 |
| Amount of catalyst/(μg/g) | 1000 | 200 |
| Hydrogen partial pressure/MPa | 17.1 | 17.7 |
| Volume ratio of hydrogen to upgrading feedstock | 1200 | 1500 |
| Processing of conversion product | | |
| First pressure/MPa | 17 | 18 |
| First temperature/° C. | 410 | 415 |
| Second pressure/MPa | 0.22 | 0.5 |
| Second temperature/° C. | 360 | 380 |
| Extraction separation | | |
| Solvent | n-$C_4H_8$ | i-$C_4H_8$ |
| Third temperature/° C. | 130 | 120 |
| Solvent weight ratio | 2.5 | 4.0 |
| Third pressure/MPa | 4.0 | 5.0 |
| Product distribution/wt % | | |
| Gas component | 7.8 | 6.6 |
| Naphtha fraction | 8.4 | 7.7 |
| Atmospheric gas oil | 19.4 | 18.1 |
| Upgraded oil | 61.7 | 58.8 |
| Pitch discarded | 5.2 | 10.9 |
| Upgrading results | | |
| Conversion rate of low-quality oil/% | 94.8 | 89.1 |
| Yield of upgraded oil/% | 89.5 | 84.6 |
| Yield of toluene-insoluble/% | 0.4 | 0.8 |

By comparing the results shown in Tables 4 and 5, it can be seen that the recycling of the pitch is beneficial to improve the conversion rate of the low-quality oil and the yield of the upgraded oil.

Example 14

The upgraded oil obtained in Example 12 was subjected to a hydrotreatment. The operating conditions and results of the hydrotreatment are shown in Table 6.

TABLE 6

| Item | Example 14 |
|---|---|
| Feedstock oil | Upgraded oil from Example 12 |
| Properties of feedstock oil | |
| Content of asphaltenes/wt % | <0.5 |
| Heavy metal (Ni + V)/(μg/g) | <2 |
| Hydrotreatment | |
| Reaction temperature/° C. | 375 |
| Reaction pressure/MPa | 14.0 |
| Hydrogenation catalyst | C-424 from American Standard |
| Volumetric space velocity/$h^{-1}$ | 1.0 |
| Hydrogen-to-oil volume ratio | 600 |
| Hydrogen partial pressure/MPa | 13.0 |
| Properties of hydrotreated upgraded oil | |
| Density (20° C.)/(kg/$m^3$) | 910.3 |
| Viscosity (50° C.)/($mm^2$/s) | 5.4 |
| w (Sulfur)/(μg/g) | 446 |
| w (Ni + V)/(μg/g) | <1 |
| Conradson Carbon residue/% | 0.98 |
| w (ash)/% | 0.010 |

From the properties of the feedstock oil shown in Table 6, it can be seen that the asphaltenes content of the upgraded oil is less than 0.5% and the heavy metal content is less than 2 μg/g, and therefore a high asphaltenes conversion rate and a high metal removal rate of the upgrading feedstock oil have been achieved. After hydrotreatment, the properties of the resulted hydrotreated upgraded oil meet the requirements for FCC feed.

Example 15

The upgraded oil obtained in Example 12 was subjected to hydrocracking. The operating conditions and results of the hydrocracking are listed in Tables 7-1 and 7-2.

TABLE 7-1

| Item | Example 15 |
|---|---|
| Feedstock oil | Upgraded oil from Example 12 |
| Hydrocracking | |
| Reaction temperature/° C. | 380 |
| Reaction pressure/MPa | 15.0 |
| Hydrocracking catalyst | RIPP RT-5 |
| Volumetric space velocity/$h^{-1}$ | 0.4 |
| Hydrogen-to-oil volume ratio | 1000 |
| Hydrogen partial pressure/MPa | 13.8 |
| Product distribution/wt % | |
| Dry gas + Non-condensable gas | 3.80 |
| Liquefied gas | 3.61 |
| Light naphtha | 7.15 |
| Heavy naphtha | 11.22 |
| Aviation kerosene | 38.81 |
| Diesel oil | 23.83 |
| Cracked tail oil | 14.48 |

The properties of the aviation kerosene and diesel oil are shown in the following table.

TABLE 7-2

| Item | Measured value |
|---|---|
| Name | Aviation kerosene |
| Density (20° C.)/(kg/$m^3$) | 797.2 |
| w (Sulfur)/(μg/g) | <0.5 |
| w (Nitrogen)/(μg/g) | <0.5 |
| Closed-cup flash point/° C. | 42 |
| Smoke point/mm | 29 |
| Ice point/° C. | <−50 |
| Name | Diesel oil |
| Density (20° C.)/(kg/$m^3$) | 843.1 |
| w (Sulfur)/(μg/g) | 7.1 |
| w (Nitrogen)/(μg/g) | <0.5 |
| Cetane number | 52.6 |
| Freezing point/° C. | −20 |

From the results of these tables, it can be seen that that hydrocracking of the upgraded oil can provide a high-quality aviation kerosene and a high-quality diesel oil, and the yield of the aviation kerosene is greater than 38%.

Example 16

The hydrotreated upgraded oil obtained in Example 14 was subjected to catalytic cracking. The operating conditions and results of the catalytic cracking are shown in Table 8.

TABLE 8

| Item | Example 16 |
| --- | --- |
| Feedstock oil | Hydrotreated upgraded oil from Example 14 |
| Catalytic cracking | |
| Reaction temperature/° C. | 520 |
| Reaction pressure/MPa | 0.4 |
| Reaction time/second | 2 |
| Cracking catalyst | CDOS-B1 |
| Catalyst-to-oil ratio | 6.0 |
| Steam-to-oil ratio | 0.3 |
| Conversion rate of feedstock oil/% | 71.01 |
| Product distribution/wt % | |
| Dry gas | 1.91 |
| Liquefied gas | 12.84 |
| $C_5^+$ gasoline | 49.40 |
| Cycle oil | 17.33 |
| Slurry oil | 11.66 |
| Coke | 6.86 |
| Properties of $C_5^+$ gasoline | |
| RON | 92.1 |

From the results shown in Table 8, it can be seen that a high-octane gasoline can be obtained by the catalytic cracking of the hydrotreated upgraded oil. The yield of the high-octane gasoline is 49.40%, of which the research octane number was 92.1.

Example 17

The atmospheric gas oil obtained in Example 12 was subjected to catalytic cracking together with the hydrotreated upgraded oil obtained in Example 14. The operating conditions and results of the catalytic cracking are shown in Table 9.

TABLE 9

| Item | Example 17 |
| --- | --- |
| Feedstock oil | Atmospheric gas oil from Example 12 + Hydrotreated upgraded oil from Example 14 |
| Catalytic cracking | |
| Reaction temperature/° C. | 515 |
| Reaction pressure/MPa | 0.2 |
| Reaction time/second | 1 |
| Cracking catalyst | CDOS-B2 |
| Catalyst-to-oil ratio | 10.0 |
| Steam-to-oil ratio | 0.2 |
| Conversion rate of feedstock oil/% | 75.32 |
| Product distribution/wt % | |
| Dry gas | 1.92 |
| Liquefied gas | 16.41 |

TABLE 9-continued

| Item | Example 17 |
| --- | --- |
| $C_5^+$ gasoline | 52.62 |
| Cycle oil | 19.63 |
| Slurry oil | 5.05 |
| Coke | 4.37 |
| Properties of $C_5^+$ gasoline | |
| RON | 92.0 |

From the results shown in Table 9, it can be seen that the catalytic cracking of the hydrotreated upgraded oil together with the atmospheric gas oil can provide a high-octane gasoline with an octane number greater than 92. The yield of the high-octane gasoline is 52.62%.

Example 18

The atmospheric gas oil obtained in Example 12 was subjected to a hydrotreatment. The operating conditions and results of the hydrotreatment are shown in Table 10.

TABLE 10

| Item | Example 18 |
| --- | --- |
| Feedstock oil | Atmospheric gas oil from Example 12 |
| Hydrotreatment | |
| Reaction temperature/° C. | 360 |
| Reaction pressure/MPa | 12.0 |
| Hydrogenation catalyst | DC-2118 from American Standard |
| Volumetric space velocity/$h^{-1}$ | 0.8 |
| Hydrogen-to-oil volume ratio | 800 |
| Hydrogen partial pressure/MPa | 10.8 |
| Properties of the product | |
| Density (20° C.)/(kg/m$^3$) | 845.6 |
| w (Sulfur)/(μg/g) | 8.2 |
| w (N)/(μg/g) | 5.9 |
| Cetane number | 51.3 |
| Freezing point/° C. | −20 |

From the results shown in Table 10, it can be seen that a high-quality diesel oil can be obtained by the hydrotreatment of the atmospheric gas oil, which has a cetane number of greater than 51.

Example 19

The cycle oil obtained in Example 16 or Example 17 was subjected to a hydrotreatment together with the upgraded oil obtained in Example 12, and the resulted hydrotreated oil was further subjected to catalytic cracking. The operating conditions and results of the hydrotreatment and catalytic cracking are shown in Table 11.

TABLE 11

| Item | Example 19 |
| --- | --- |
| Feedstock oil | Cycle oil + Upgraded oil |
| Proportion of feedstock (Cycle oil/Upgraded oil) | 0.42 |
| Hydrotreatment | |
| Reaction temperature/° C. | 375 |
| Reaction pressure/MPa | 16.0 |
| Hydrogen partial pressure/MPa | 15.2 |

TABLE 11-continued

| Item | Example 19 |
| --- | --- |
| Hydrogenation catalyst | LD746 from Axens Company |
| Volumetric space velocity/h$^{-1}$ | 0.6 |
| Hydrogen-to-oil volume ratio | 1000 |
| Catalytic cracking | |
| Reaction temperature/° C. | 500 |
| Reaction time/s | 2 |
| Reaction pressure/MPa | 0.2 |
| Cracking catalyst | LDR-100 |
| Volumetric space velocity/h$^{-1}$ | 4.0 |
| Catalyst-to-oil ratio | 8.0 |
| Steam-to-oil ratio | 0.2 |
| Distribution of catalytic cracking product/wt % | |
| Dry gas | 2.02 |
| Liquefied gas | 14.16 |
| C$_5^+$ gasoline | 56.47 |
| Cycle oil | 12.65 |
| Slurry oil | 8.48 |
| Coke | 6.22 |
| Properties of C$_5^+$ gasoline | |
| RON | 93.1 |

From the results shown in Table 11, it can be seen that, by subjecting the cycle oil to a hydrotreatment together with the upgraded oil and then to catalytic cracking, a high-octane gasoline component with an octane number greater than 93 can be obtained. The yield of the high-octane gasoline component can reach 56.47%.

Example 20

On a pilot plant, based on Example 12, the slurry oil obtained in Example 16 was recycled to the conversion reaction, mixed with a low-quality oil and recycled pitch, and then used as an upgrading feedstock for the conversion reaction, followed by the processing of the conversion product, to obtain a first separated product and a second separated product. The first separated product was subjected to extraction separation to obtain an upgraded oil and a pitch. A part of the pitch was recycled, and the rest was discarded. The operating conditions and results of each step are shown in Table 12.

TABLE 12

| Item | Example 12 | Example 20 |
| --- | --- | --- |
| Upgrading feedstock | Upgrading feedstock B + Pitch | Upgrading feedstock B (90) + Slurry oil (10) + Pitch |
| Source of slurry oil | — | Example 16 |
| Source of Pitch | Itself (Example 12) | Itself (Example 20) |
| Conversion reaction | | |
| Reaction temperature/° C. | 430 | |
| Reaction pressure/MPa | 18 | |
| Conversion catalyst | Ammonium molybdate | |
| Volumetric space velocity/h$^{-1}$ | 0.2 | |
| Amount of catalyst/(μg/g) | 10000 | |
| Hydrogen partial pressure/MPa | 16.4 | |
| Volume ratio of hydrogen to upgrading feedstock | 1100 | |
| Processing of conversion product | | |
| First pressure/MPa | 17 | |
| First temperature/° C. | 410 | |
| Second pressure/MPa | 0.22 | |
| Second temperature/° C. | 360 | |
| Extraction separation | | |
| Solvent | n-C$_4$H$_8$ | |
| Third temperature/° C. | 130 | |
| Solvent weight ratio | 2.5 | |
| Third pressure/MPa | 4.0 | |
| Upgrading results | | |
| Conversion rate of low-quality oil/% | 94.8 | 96.8 |
| Yield of upgraded oil/% | 89.5 | 91.0 |
| Yield of toluene-insoluble/% | 0.4 | 0.3 |

The results shown in Table 12 show that the recycling of the slurry oil is beneficial to improve the conversion rate of the low-quality oil and the yield of the upgraded oil, which are increased by 2.0% and 1.5%, respectively. The yield of toluene-insoluble is decreased by 25%, and the number of days of stable operation is greater than 30, which is beneficial to the long-term stable operation of the upgrading system.

Example 21

On a pilot plant, the upgrading feedstock B was used as the upgrading feedstock for conversion reaction, and then the conversion product was processed to obtain a first separated product and a second separated product. The first separated product was then subjected to extraction separation (extraction separation conditions were the same as in Example 12) to obtain an upgraded oil and a pitch. A part of the pitch was recycled to the conversion unit, and the rest was discarded. The conversion product of the mixed feedstock was sequentially processed to obtain a first separated product and a second separated product. The first product was further subjected to extraction separation (extraction separation conditions were the same as those in Example 12) to obtain an upgraded oil and a pitch. The operating conditions and results of each step are listed in Table 13.

Comparative Examples 1-4

The same operation was carried out as in Example 21, except for the changes shown in Table 13.

TABLE 13

| Item | Example 21 | Comparative Example 1 | Comparative Example 2 | Comparative Example 3 | Comparative Example 4 |
|---|---|---|---|---|---|
| Upgrading feedstock | Upgrading feedstock B + Pitch | Upgrading feedstock B + Pitch | Upgrading feedstock B + Pitch | Upgrading feedstock B + Pitch | Upgrading feedstock B + Pitch |
| Conversion reaction | | | | | |
| Reaction temperature/° C. | 425 | 415 | 420 | 410 | 425 |
| Reaction pressure/MPa | 18 | 18 | 18 | 18 | 18 |
| Conversion catalyst | Ammonium molybdate | Ammonium molybdate | Hematite | Molybdenum naphthenate + Nickel naphthenate | Ammonium molybdate |
| Volumetric space velocity/$h^{-1}$ | 0.15 | 0.15 | 0.3 | 0.2 | 0.15 |
| Amount of catalyst/(μg/g) | 1000 | 300 | 1500 | 200 | 800 |
| Hydrogen partial pressure/MPa | 17.4 | 17.4 | 17.4 | 17.4 | 17.4 |
| Volume ratio of hydrogen to upgrading feedstock | 1300 | 1300 | 800 | 500 | 1000 |
| Processing of conversion product | | | | | |
| First pressure/MPa | 18 | 18 | 18 | 18 | 18 |
| First temperature/° C. | 410 | 410 | 390 | 420 | 410 |
| Second pressure/MPa | 1.5 | 0.02 | 5.0 | 0.05 | 6.5 |
| Second temperature/° C. | 320 | 480 | 290 | 500 | 280 |
| Product distribution/wt % | | | | | |
| First separated product | 67.7 | 80.4 | 70.4 | 82.3 | 62.7 |
| Boiling range of special component in first separated product/° C. | 355~490 | 480~524 | 280~500 | 490~524 | 260~520 |
| Content of special component in first separated product/wt % | 34 | 15 | 37 | 10 | 48 |
| Initial boiling point of first separated product/° C. | 306 | 464 | 262 | 485 | 254 |
| Final boiling point of second separated product/° C. | 324 | 484 | 285 | 505 | 276 |
| Upgrading results | | | | | |
| Conversion rate of low-quality oil/% | 92.6 | 84.8 | 82.4 | 86.5 | 83.7 |
| Yield of upgraded oil/% | 86.4 | 79.6 | 78.2 | 81.5 | 79.3 |
| Yield of toluene-insoluble/% | 0.9 | 2.9 | 1.1 | 3.3 | 1.0 |
| Unstable situation | None | ΔT > 5° C. | Black upgraded oil | ΔT > 5° C. | Black upgraded oil |
| Days of stable operation | >30 | <10 | <10 | <9 | <9 |

The results shown in Table 13 show that when the special component does not meet the corresponding requirements of the present application, the conversion rate of the low-quality oil is reduced by 6-10%, the yield of the upgraded oil is reduced by 5-8%, and the yield of toluene-insoluble is increased by 1-2.5%, and because ΔT is greater than 5° C.

or the color of the upgraded oil is black, the number of days of stable operation of the upgraded system is greatly reduced.

In the context of the present application, a large amount of specific technical information is disclosed. However, those skilled in the art can appreciate that the present invention can also be implemented without these specific technical information. In some aspects or embodiments of the present invention, well-known methods, structures, and techniques that are not explained or described in detail, but this does not affect the understanding of the present invention.

Similarly, it should be understood that, in order to make the description of the present application concise and to help those skilled in the art understand the spirit of the present invention, while illustrating the upgrading process or the upgrading system of the present application, sometimes a plurality of different aspects (or embodiments) may be provided in combination in working examples or drawings. However, it should not be interpreted to reflect the intention that the technical solution claimed in the present invention has a greater number of features than the technical solution described in the claims. Particularly, as reflected in the claims, the technical solution claimed in the present application comprises fewer technical features than the working examples or drawings described in the context of the present application.

In the context of the present application, the terms such as "first" and "second", etc. are only used to distinguish one entity or operation from another entity or operation, without requiring or implying any specific relationship or order of these entities or operations. Moreover, the terms "including", "comprising" or the like are non-exclusive expressions, so that the process, method, article or device described using these terms may comprise not only one or more elements explicitly described herein, but also one or more other elements not explicitly described herein, such as one or more elements inherent to the process, method, article, or device.

The embodiments disclosed herein are only used to exemplarily illustrate the embodiments of the present application, but not to make any limitation to it. Although the present invention is described in detail with reference to these embodiments in the present description, it should be understood that those skilled in the art can still modify or change the technical solutions described in these embodiments, or replace a part of their technical features with equivalent features. The technical solutions obtained through such modification, change, or replacement does not depart from the spirit of the present invention, and therefore still fall within the scope of the present invention.

The invention claimed is:

1. An upgrading process, comprising:
   (1) subjecting a low-quality oil used as an upgrading feedstock to a conversion reaction in the presence of hydrogen to obtain a conversion product,
   (2) processing the conversion product to obtain a first processed product, wherein the first processed product comprises from 20 wt % to 60 wt % of a component having a boiling point or boiling range between 350° C. and 524° C., and
   (3) subjecting the first processed product to extraction separation to obtain an upgraded oil and a pitch.

2. The upgrading process according to claim 1, wherein the step (2) further comprises:
   (2-1) subjecting the conversion product to a first separation at a first pressure and a first temperature to obtain a gas component and a liquid component, and
   (2-2) subjecting the liquid component to a second separation at a second pressure and a second temperature to obtain a second separated product and a first separated product, wherein the first separated product is the first processed product, and the second separated product or any component thereof has a final boiling point of less than or equal to 350° C.,
   wherein the first pressure is 4-24 MPa greater than the second pressure.

3. The upgrading process according to claim 2, wherein the first pressure is in a range from 10.0 MPa to 25.0 Mpa and the first temperature is in a range from 380° C. to 470° C.; or the second pressure is in a range from 0.1 MPa to 5.0 Mpa, and the second temperature is in a range from 150° C. to 390° C.

4. The upgrading process according to claim 2, wherein the step (2) further comprises:
   (2-3) separating the second separated product to obtain naphtha and atmospheric gas oil, and
   (2-4) subjecting the gas component to step (1), and
   wherein the first pressure is 7-19 MPa greater than the second pressure.

5. The upgrading process according to claim 1, wherein the step (3) further comprises:
   (3-1) contacting the first processed product with a solvent at a third pressure and a third temperature to obtain the upgraded oil and the pitch.

6. The upgrading process according to claim 5, wherein the solvent is one or more of $C_{3-7}$ hydrocarbons, and a weight ratio of the solvent to the first processed product is 1-7:1.

7. The upgrading process according to claim 5, wherein the third pressure is in a range from 3 MPa to 12 Mpa, and the third temperature is in a range from 55° C. to 300° C.

8. The upgrading process according to claim 5, wherein the step (3) further comprises one or more of the following steps:
   (3-2) subjecting the upgraded oil to hydrogenation to obtain a hydrotreated upgraded oil,
   (3-3) subjecting the upgraded oil to hydrocracking to obtain a hydrocracked product, and then separating the hydrocracked product into dry gas, liquefied gas, aviation kerosene, diesel oil, and hydrogenated tail oil,
   (3-4) subjecting the hydrotreated upgraded oil to catalytic cracking to obtain a first catalytic cracked product, and then separating the first catalytic cracked product into dry gas, liquefied gas, gasoline, cycle oil and slurry oil,
   (3-5) catalytically cracking a mixture comprising the hydrotreated upgraded oil and the atmospheric gas oil to obtain a second catalytic cracked product, and then separating the second catalytic cracked product into dry gas, liquefied gas, gasoline, cycle oil and slurry oil,
   (3-6) catalytically cracking a mixture comprising the hydrotreated upgraded oil and the second separated product to obtain a third catalytic cracked product, and then separating the third catalytic cracked product into dry gas, liquefied gas, gasoline, cycle oil and slurry oil,
   (3-7) subjecting the atmospheric gas oil to a hydrogenation reactor to obtain diesel oil, (3-8) subjecting the cycle oil obtained in any step of the upgrading process to a hydrogenation reactor alone or together with the upgraded oil to obtain a hydrotreated oil, (3-9) catalytically cracking a mixture comprising the hydrotreated oil and the second separated product to obtain a fourth catalytic cracked product, and then separating the fourth catalytic cracked product into dry gas, liquefied gas, gasoline, cycle oil and slurry oil, (3-10) subjecting the slurry oil obtained in any step of the upgrading process and/or an externally supplied slurry oil to the step (1), step (2), and/or step (3), or (3-11) subjecting the liquefied gas obtained in any step of the upgrading process to the step (3) or step (3-1).

9. The upgrading process according to claim 8, wherein the step (3-2) or step (3-8) is carried out in the presence of a hydrogenation catalyst under the following conditions: a hydrogen partial pressure between 5.0 MPa and 20.0 MPa, a reaction temperature between 330° C. and 450° C., a volumetric space velocity of the feedstock oil between 0.1 $h^{-1}$ and 3.0 $h^{-1}$, and a volume ratio of hydrogen to feedstock oil between 300 and 3000;

or alternatively, the step (3-3) is carried out in the presence of a hydrocracking catalyst under the following conditions: a hydrogen partial pressure between 10.0 MPa and 20.0 MPa, a reaction temperature between 310° C. and 420° C., a volumetric space velocity of the upgraded oil between 0.3 $h^{-1}$ and 1.2 $h^{-1}$, and a volume ratio of hydrogen to the upgraded oil between 600 and 1500;

or alternatively, the step (3-4), step (3-5), step (3-6) or step (3-9) is carried out in the presence of a cracking catalyst under the following conditions: a reaction temperature between 450° C. and 650° C., a reaction pressure between 0.15 MPa and 0.4 MPa, a reaction time between 0.1 seconds and 10 seconds, a weight ratio of cracking catalyst to feedstock oil between 3 and 30, and a weight ratio of steam to feedstock oil between 0.05 and 0.6;

or alternatively, the step (3-7) is carried out in the presence of a hydrogenation catalyst under the following conditions: a hydrogen partial pressure between 7.0 MPa and 15.0 MPa, a reaction pressure between 8 MPa and 12 MPa, a reaction temperature between 340° C. and 400° C.; a volumetric space velocity of the atmospheric gas oil between 0.6 $h^{-1}$ and 1.5 $h^{-1}$, and a volume ratio of hydrogen to the atmospheric gas oil between 500 and 800.

10. The upgrading process according to claim 1, wherein the conversion reaction is carried out in the presence of a conversion catalyst under the following conditions: a hydrogen partial pressure between 10.0 MPa and 25.0 MPa, a reaction temperature between 380° C. and 470° C., a volumetric space velocity of the upgrading feedstock between 0.01 $h^{-1}$ and 2.0 $h^{-1}$, and a volume ratio of hydrogen to the upgrading feedstock between 500 and 5000.

11. The upgrading process according to claim 1, wherein the pitch has a softening point of less than 150° C.

12. The upgrading process according to claim 1, wherein the low-quality oil is one or more selected from the group consisting of inferior oils, deoiled asphalt, heavy oil, extra heavy oil, coal-derived oil, shale oil, and petrochemical waste oil, and wherein the heavy oil is one or more selected from the group consisting of topped crude oil, heavy oil derived from oil sands bitumen, and heavy oil having an initial boiling point of greater than 350° C., the coal-derived oil is one or more selected from the group consisting of coal liquefied oil produced by coal liquefaction and coal tar produced by coal pyrolysis, or the petrochemical waste oil is one or more selected from the group consisting of petrochemical waste oil sludge, petrochemical oil residue, and refined products thereof.

13. The upgrading process according to claim 1, wherein the first processed product has an initial boiling point of greater than or equal to 330° C., or the first processed product further comprises a light component having a boiling point or a boiling range of less than or equal to 350° C., or the first processed product further comprises a heavy component having a boiling point or a boiling range of greater than 500° C.

14. The upgrading process according to claim 1, wherein in step (2), one or more second processed products are obtained in addition to the first processed product, and wherein the second processed product or any component thereof has a final boiling point of less than or equal to 350° C.

15. The upgrading process according to claim 1, further comprising:

(4) subjecting all or a part of the pitch to step (1).

16. An upgrading system, comprising a conversion reactor, a conversion product processing unit, a first control unit, and an extraction column, wherein the conversion product processing unit comprises a flash tank, a fractionation column, or a distillation column, wherein the conversion reactor is configured to conduct a conversion reaction of a low-quality oil in the presence of hydrogen and discharge a conversion product, the conversion product processing unit is configured to process the conversion products and discharge a first processed product, the first control unit comprises a first pressure control device and/or a first temperature control device and is configured to control the operating conditions of the conversion product processing unit such that the first processed product comprises from 20 wt % to 60 wt % of a component having a boiling point or a boiling range between 350° C. and 524° C., and the extraction column is configured to conduct an extraction separation of the first processed product and discharge an upgraded oil and a pitch.

17. The upgrading system according to claim 16, wherein the conversion product processing unit further comprises a first conversion product separation unit, and a second conversion product separation unit, the first conversion product separation unit comprises a pressure distillation column and is configured to separate the conversion product and discharge a gas component and a liquid component, and the second conversion product separation unit comprises a flash tank and/or an atmospheric distillation column is configured to separate the liquid component and discharge a second separated product and a first separated product.

18. The upgrading system according to claim 17, further comprising a a second control unit and a third control unit, wherein the second control unit comprises a second pressure control device and is configured to control the operating pressure of the first conversion product separation unit, the third control unit comprises a third pressure control device and is configured to control the operating pressure of the second conversion product separation unit, so that the operating pressure of the first conversion product separation unit is greater than the operating pressure of the second conversion product separation unit, wherein the third control unit is configured to control the operating conditions of the second conversion product separation unit so that the first separated product is the first processed product and the second separated product or any component thereof has a final boiling point of less than or equal to 350° C.

19. The upgrading system according to claim 17, further comprising one or more of the following reactors:
 a first hydrogenation reactor configured to conduct a hydrotreating on the upgraded oil and discharge a hydrotreated upgraded oil,
 a second hydrogenation reactor configured to conduct hydrocracking of the upgraded oil and separate a resulting hydrocracked product into dry gas, liquefied gas, aviation kerosene, diesel oil, and hydrogenated tail oil,
 a first catalytic cracking reactor configured to conduct catalytic cracking of the hydrotreated upgraded oil and separate a resulting first catalytic cracked product into dry gas, liquefied gas, gasoline, cycle oil, and slurry oil,
 a second catalytic cracking reactor configured to conduct catalytic cracking of a mixture comprising the hydrotreated upgraded oil and an atmospheric gas oil, and separate a resulting second catalytic cracked product into dry gas, liquefied gas, gasoline, cycle oil, and slurry oil,
 a third catalytic cracking reactor configured to conduct catalytic cracking of a mixture comprising the hydrotreated upgraded oil and the second separated product, and separate a resulting third catalytic cracked product into dry gas, liquefied gas, gasoline, cycle oil and slurry oil,
 a third hydrogenation reactor configured to hydrotreating on an atmospheric gas oil and discharge a diesel oil,
 a fourth hydrogenation reactor configured to hydrotreating a mixture comprising a cycle oil obtained in the upgrading system and the upgraded oil and discharge a hydrotreated oil,
 a fourth catalytic cracking reactor configured to conduct catalytic cracking of a mixture comprising the hydrotreated oil and the second separated product, and separate a resulting fourth catalytic cracked product into dry gas, liquefied gas, gasoline, cycle oil and slurry oil,
 a slurry oil transport pump configured to transport a slurry oil obtained in the upgrading system and/or an externally supplied slurry oil to the conversion reactor, the conversion product processing unit, and/or the extraction column, and
 a liquefied gas transport pipe configured to transport the liquefied gas obtained in the upgrading system to the extraction column.

20. The upgrading system according to claim 16, wherein the extraction column is configured to contact the first processed product with a solvent and discharge the upgraded oil and the pitch.

* * * * *